(12) United States Patent
Li et al.

(10) Patent No.: US 10,578,842 B2
(45) Date of Patent: *Mar. 3, 2020

(54) OPTICAL IMAGING LENS

(71) Applicant: Genius Electronic Optical (Xiamen) Co., Ltd., Xiamen, Fujian (CN)

(72) Inventors: Guangyun Li, Fujian (CN); Yanbin Chen, Fujian (CN); Yanxuan Yin, Fujian (CN)

(73) Assignee: Genius Electronic Optical (Xiamen) Co., Ltd., Xiamen, Fujian (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/352,842

(22) Filed: Mar. 14, 2019

(65) Prior Publication Data
US 2019/0271835 A1 Sep. 5, 2019

Related U.S. Application Data

(63) Continuation of application No. 15/893,710, filed on Feb. 12, 2018, now Pat. No. 10,274,707, which is a continuation of application No. 15/650,968, filed on Jul. 16, 2017, now Pat. No. 9,933,602.

(30) Foreign Application Priority Data

Jun. 5, 2017 (CN) .......................... 2017 1 0411727

(51) Int. Cl.
| | |
|---|---|
| *G02B 26/08* | (2006.01) |
| *G02B 13/18* | (2006.01) |
| *G02B 13/00* | (2006.01) |
| *G02B 7/02* | (2006.01) |
| *G02B 27/12* | (2006.01) |

(52) U.S. Cl.
CPC .......... *G02B 13/18* (2013.01); *G02B 13/002* (2013.01); *G02B 13/0045* (2013.01); *G02B 7/021* (2013.01); *G02B 27/123* (2013.01)

(58) Field of Classification Search
CPC .... G02B 13/18; G02B 13/006; G02B 13/004; G02B 9/54; G02B 9/58; G02B 9/60; G02B 13/04; G02B 13/08; G02B 13/0045; G02B 7/021; G02B 27/0025; G02B 13/002; G02B 27/123; H04N 5/2254; H04N 5/2257
USPC ............................................. 359/206, 1, 659
See application file for complete search history.

(56) References Cited

U.S. PATENT DOCUMENTS

| | | | |
|---|---|---|---|
| 9,933,602 B1 * | 4/2018 | Li | G02B 13/002 |
| 10,274,707 B2 * | 4/2019 | Li | G02B 13/002 |

* cited by examiner

*Primary Examiner* — Euncha P Cherry
(74) *Attorney, Agent, or Firm* — Winston Hsu

(57) ABSTRACT

An optical imaging lens includes a first lens of an image-side surface with a concave portion in a vicinity of its optical-axis, a second lens of an object-side surface with a convex portion in a vicinity of its optical-axis, a third lens of an image-side surface with a concave portion in a vicinity of its optical-axis, a fifth lens of negative refractive power and with a thickness along its optical-axis larger than that of the second lens. EFL is the effective focal length of the optical imaging lens, TTL is the distance from the object-side surface of the first lens element to an image plane, ALT is a total thickness of all five lenses, the second lens has a second lens thickness T2 and an air gap G34 is between the third lens element and the fourth lens element along the optical axis to satisfy TTL/EFL≤1.000, TTL/G34≤12.000 and ALT/T2≤12.900.

20 Claims, 25 Drawing Sheets

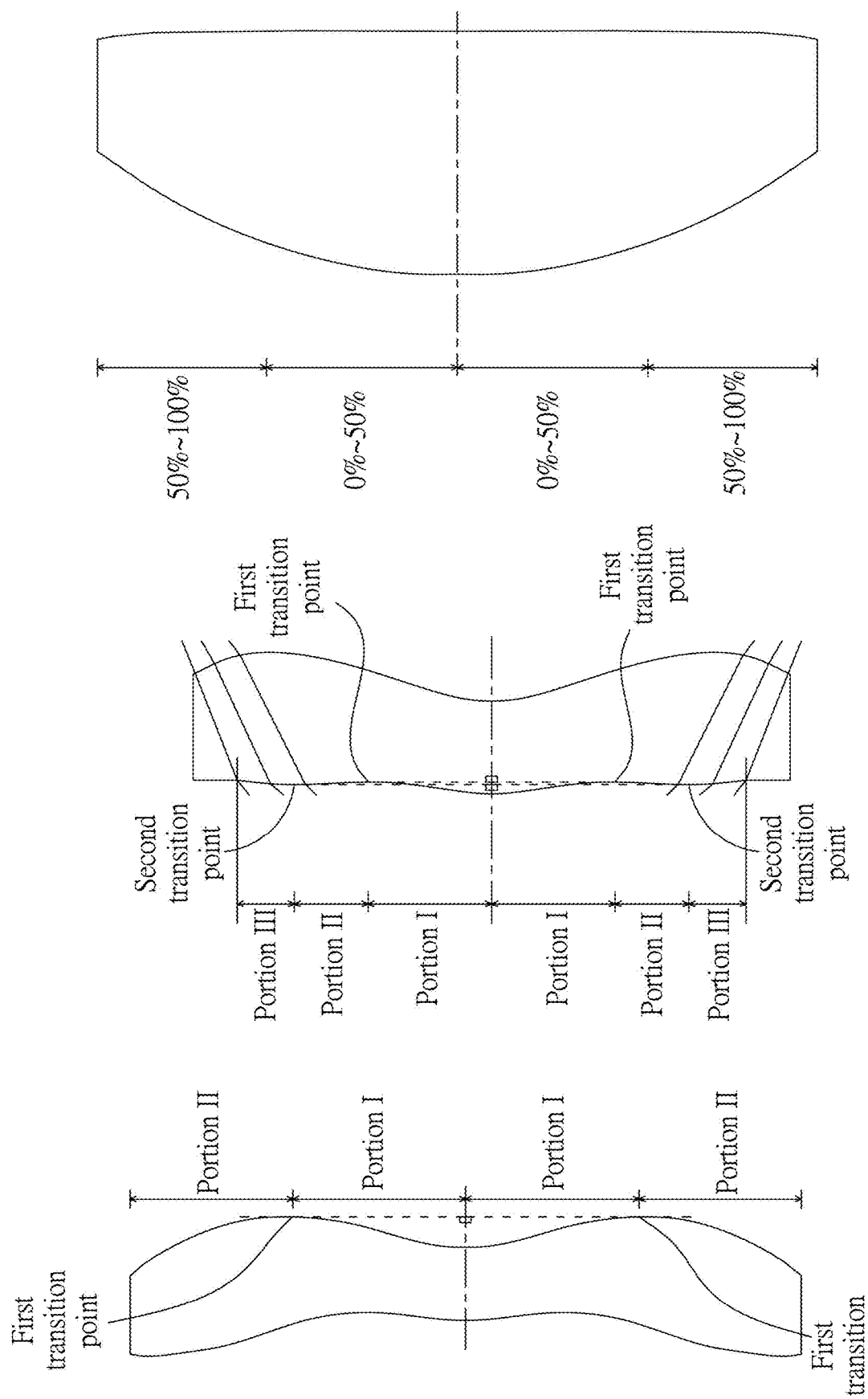

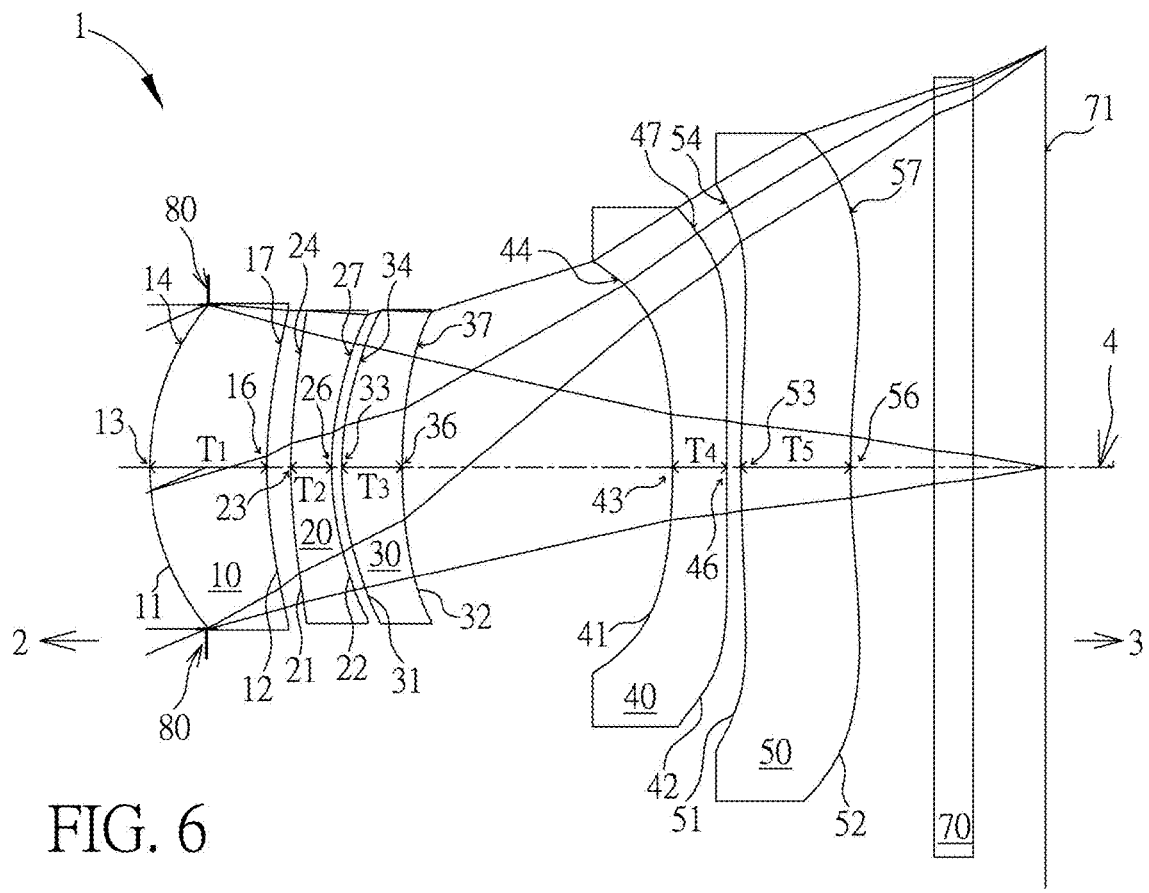
FIG. 6
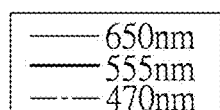
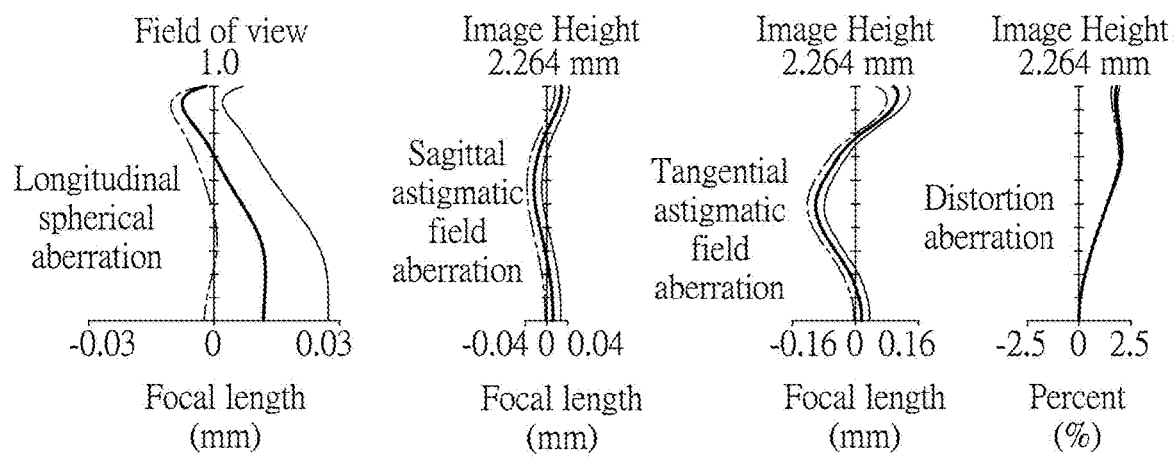
FIG. 7A  FIG. 7B  FIG. 7C  FIG. 7D

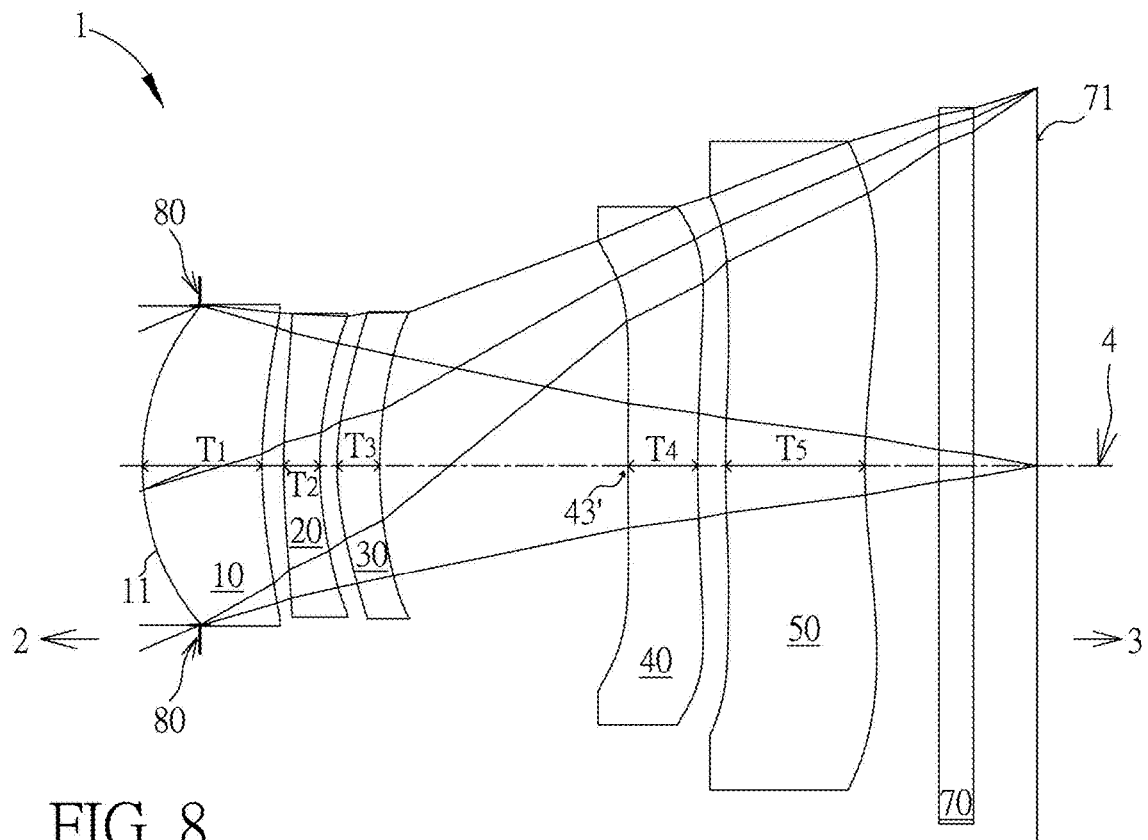
FIG. 8
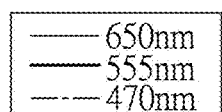
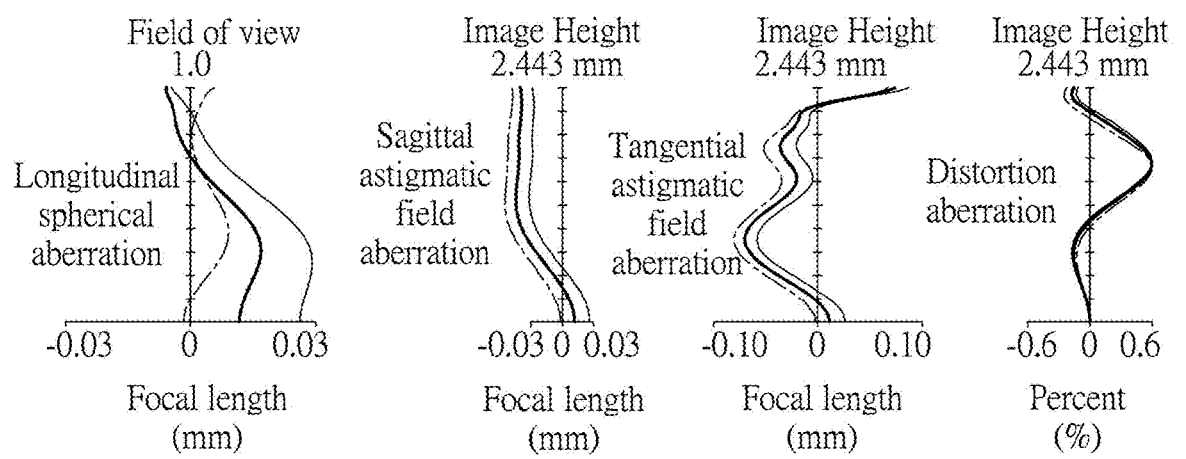
FIG. 9A  FIG. 9B  FIG. 9C  FIG. 9D

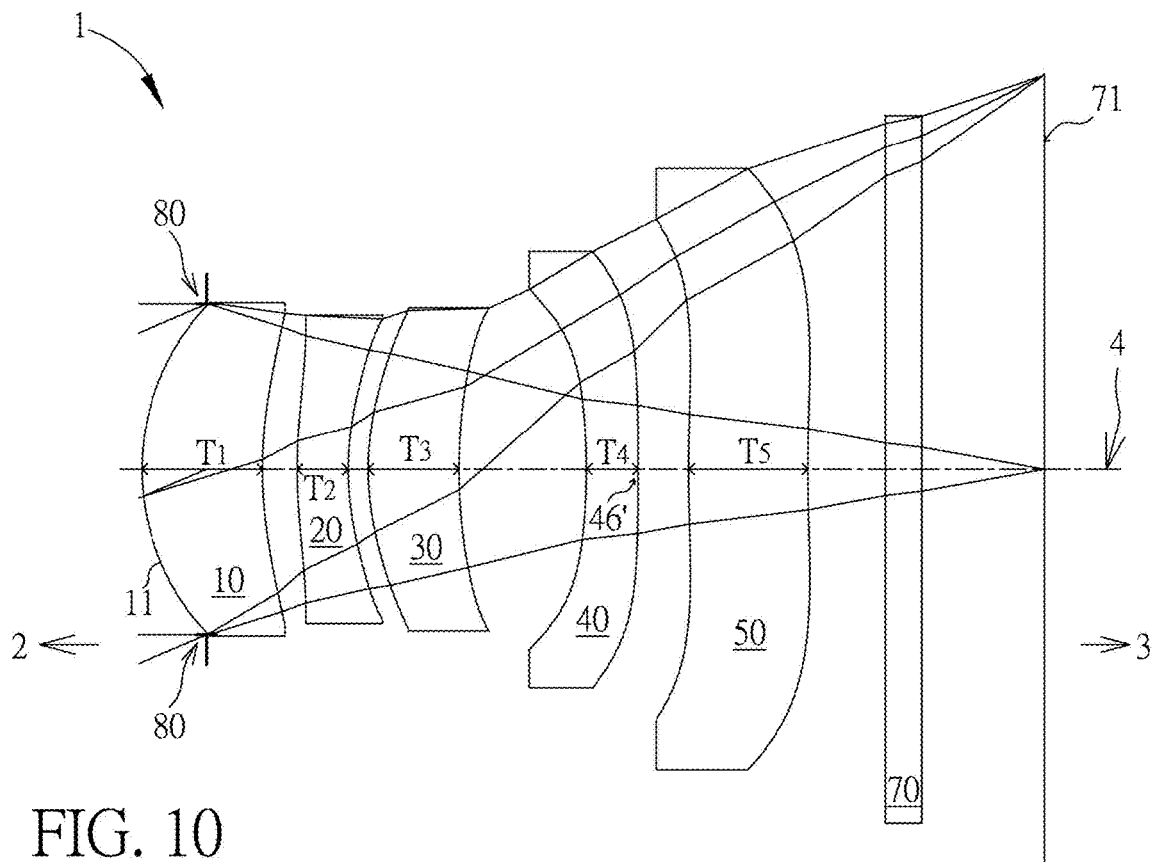
FIG. 10
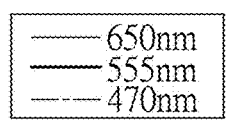
FIG. 11A    FIG. 11B   FIG. 11C   FIG. 11D
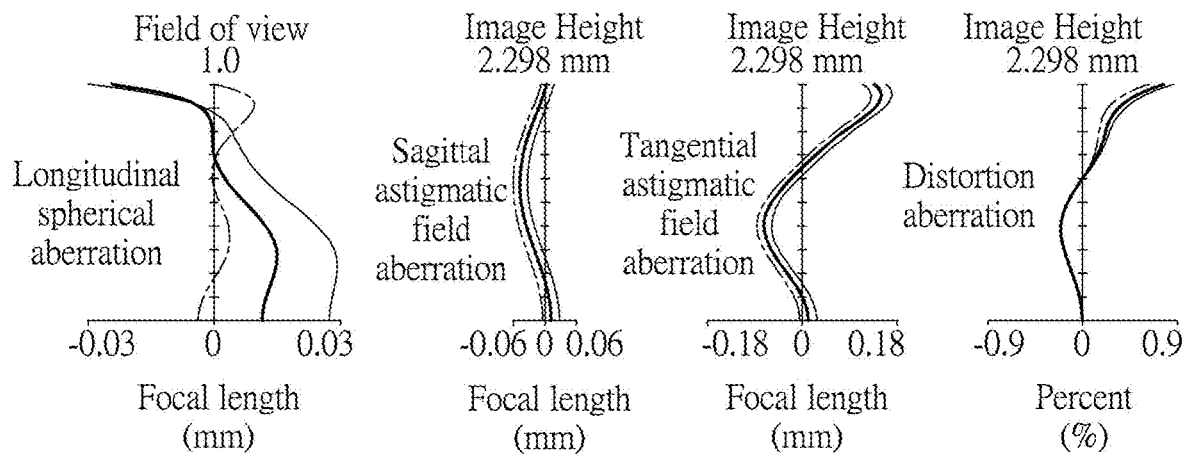

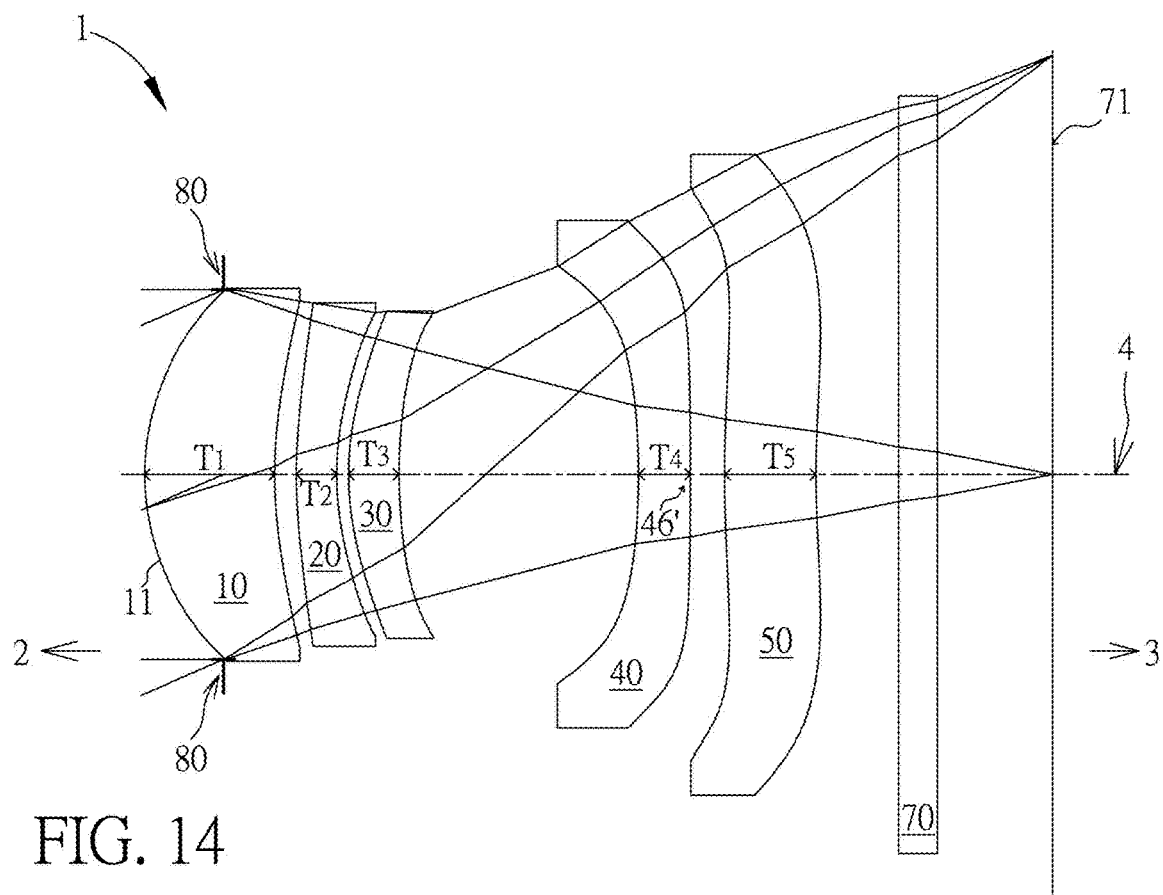
FIG. 14
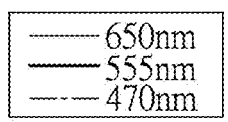
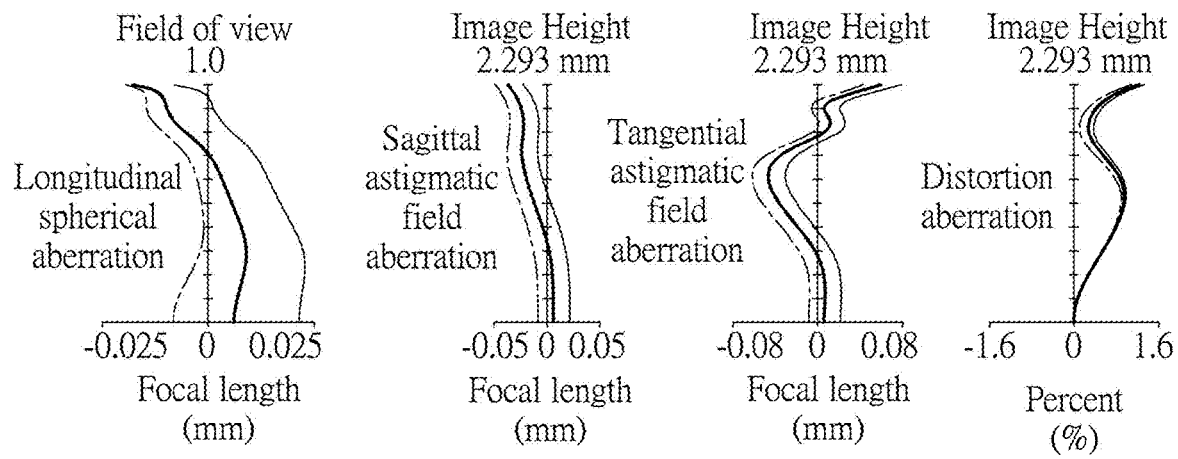
FIG. 15A  FIG. 15B  FIG. 15C  FIG. 15D

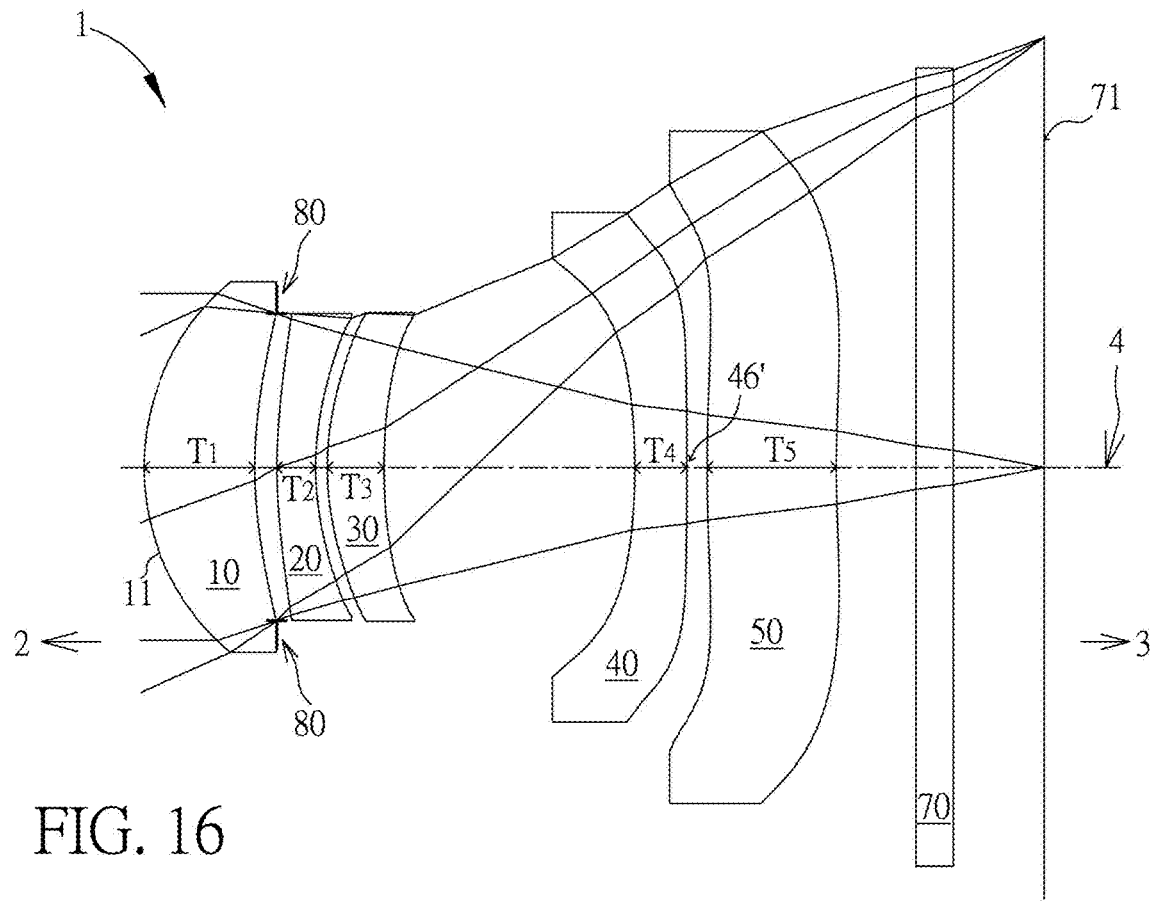
FIG. 16
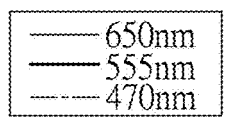
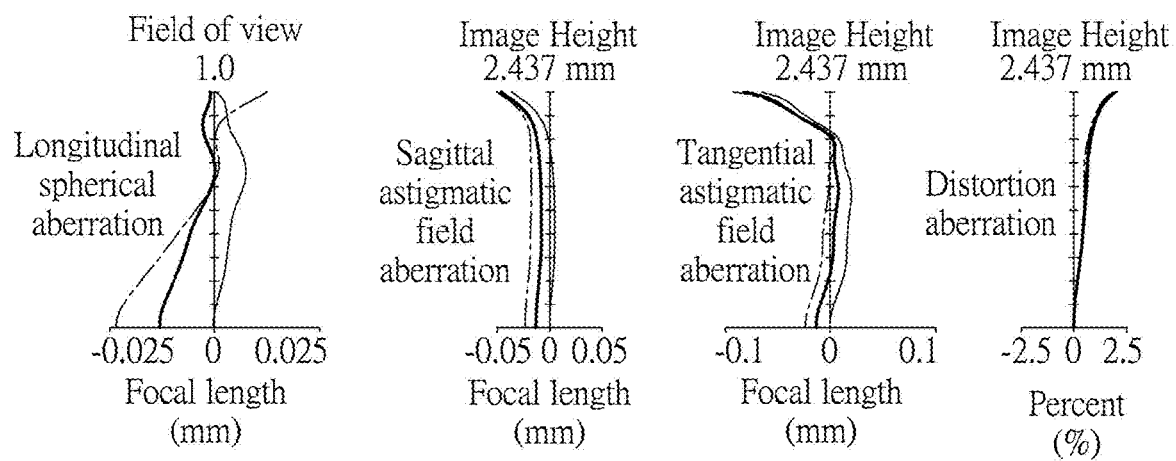
FIG. 17A   FIG. 17B   FIG. 17C   FIG. 17D

| First Example | | | | | | |
|---|---|---|---|---|---|---|
| EFL=5.260 mm, HFOV=23.000 Degrees, TTL=4.840 mm, Fno=3, IMH=2.264 mm | | | | | | |
| No. | | Curvature Radius | Ape. Stop Distance Lens Thickness Air Gap | | Refractive Index | Abbe No. | Focal Length |
| | Object | INFINITY | INFINITY | | | | |
| 80 | Ape. Stop | INFINITY | -0.304 | | | | |
| 11 | First Lens | 1.385 | 0.827 | $T_1$ | 1.545 | 55.987 | 3.386 |
| 12 | | 4.346 | 0.080 | $G_{12}$ | | | |
| 21 | Second Lens | 5.396 | 0.338 | $T_2$ | 1.661 | 20.412 | -5.984 |
| 22 | | 2.237 | 0.204 | $G_{23}$ | | | |
| 31 | Third Lens | 1.896 | 0.283 | $T_3$ | 1.545 | 55.987 | 60.963 |
| 32 | | 1.905 | 1.027 | $G_{34}$ | | | |
| 41 | Fourth Lens | 47.468 | 0.558 | $T_4$ | 1.545 | 55.987 | 86.401 |
| 42 | | -8281.194 | 0.212 | $G_{45}$ | | | |
| 51 | Fifth Lens | 42.235 | 0.500 | $T_5$ | 1.642 | 22.409 | -9.640 |
| 52 | | 5.411 | 0.350 | | | | |
| 70 | IR Filter | INFINITY | 0.210 | | 1.517 | 64.167 | |
| | | INFINITY | 0.527 | | | | |
| 71 | Image Plane | INFINITY | | | | | |

FIG. 20

| No. | 11 | 12 | 21 | 22 | 31 |
|---|---|---|---|---|---|
| K | 0 | 0 | 0 | 0 | 0 |
| a2 | 0 | 0 | 0 | 0 | 0 |
| a4 | -1.854281E-02 | -1.079724E-01 | -1.225936E-01 | -6.902793E-02 | -4.957118E-02 |
| a6 | 2.504959E-02 | 7.211870E-02 | 3.724530E-02 | -1.098255E-01 | -1.030090E-01 |
| a8 | -3.007414E-02 | -3.015449E-02 | 3.720045E-02 | 1.123699E-01 | 9.648872E-03 |
| a10 | 1.562645E-02 | -1.711626E-02 | 3.209333E-03 | 5.842360E-02 | -4.827194E-02 |
| a12 | 6.010567E-03 | 2.999974E-02 | -2.487473E-02 | 1.257518E-01 | 2.603769E-01 |
| a14 | -1.288389E-02 | 1.259589E-02 | 2.874728E-02 | -2.633163E-02 | 2.272330E-01 |
| a16 | 6.326202E-03 | -2.137170E-02 | -3.621983E-02 | -6.004170E-02 | -3.226533E-01 |
| No. | 32 | 41 | 42 | 51 | 52 |
| K | 0 | 0 | 0 | 0 | 0 |
| a2 | 0 | 0 | 0 | 0 | 0 |
| a4 | 1.281441E-02 | -5.201385E-02 | 3.556647E-02 | -3.695685E-02 | -8.800457E-02 |
| a6 | 2.205187E-01 | -6.250864E-02 | -1.274715E-01 | -1.445063E-02 | 2.323046E-02 |
| a8 | -4.217340E-01 | -9.552962E-02 | 1.120358E-01 | 3.220191E-02 | -5.132868E-03 |
| a10 | 1.589182E-01 | 1.245455E-01 | -6.623427E-02 | -1.698223E-02 | 3.309246E-05 |
| a12 | 6.841214E-01 | -1.192941E-01 | 3.713604E-03 | -6.354701E-03 | 5.020958E-05 |
| a14 | -7.337435E-01 | 4.580131E-02 | 9.044299E-03 | 5.750664E-03 | -2.511382E-05 |
| a16 | 2.061806E-01 | 1.519160E-03 | -1.841564E-03 | -9.286455E-04 | 7.079618E-06 |

FIG. 21

| Second Example | | | | | | |
|---|---|---|---|---|---|---|
| EFL=5.447 mm, HFOV=24.263 Degrees, TTL=5.447 mm, Fno=2.8, IMH=2.443 mm | | | | | | |
| No. | | Curvature Radius | Ape. Stop Distance Lens Thickness Air Gap | Refractive Index | Abbe No. | Focal Length |
| | Object | INFINITY | INFINITY | | | |
| 80 | Ape. Stop | INFINITY | -0.352 | | | |
| 11 | First Lens | 1.482 | 0.730 $T_1$ | 1.545 | 55.987 | 4.708 |
| 12 | | 2.888 | 0.131 $G_{12}$ | | | |
| 21 | Second Lens | 3.986 | 0.220 $T_2$ | 1.661 | 20.412 | -7.392 |
| 22 | | 2.156 | 0.105 $G_{23}$ | | | |
| 31 | Third Lens | 1.807 | 0.259 $T_3$ | 1.545 | 55.987 | 8.671 |
| 32 | | 2.773 | 1.512 $G_{34}$ | | | |
| 41 | Fourth Lens | 176.831 | 0.424 $T_4$ | 1.545 | 55.987 | -20.308 |
| 42 | | 10.430 | 0.169 $G_{45}$ | | | |
| 51 | Fifth Lens | 6.691 | 0.850 $T_5$ | 1.642 | 20.412 | -14.779 |
| 52 | | 3.784 | 0.450 | | | |
| 70 | IR Filter | INFINITY | 0.210 | 1.517 | 64.167 | |
| | | INFINITY | 0.388 | | | |
| 71 | Image Plane | INFINITY | | | | |

FIG. 22

| No. | 11 | 12 | 21 | 22 | 31 |
|---|---|---|---|---|---|
| K | 0 | 0 | 0 | 0 | 0 |
| a2 | 0 | 0 | 0 | 0 | 0 |
| a4 | -1.539156E-02 | -1.020373E-01 | -1.257320E-01 | -6.380393E-02 | -5.271063E-02 |
| a6 | 2.931703E-02 | 6.316580E-02 | 3.642711E-02 | -9.509065E-02 | -1.132945E-01 |
| a8 | -3.157155E-02 | -3.133271E-02 | 3.342770E-02 | 1.240513E-01 | -4.195903E-02 |
| a10 | 1.596763E-02 | -4.447753E-03 | 2.104076E-03 | 2.678582E-02 | -1.140328E-02 |
| a12 | 7.682495E-03 | 3.164748E-02 | -1.151307E-02 | 9.065991E-02 | 2.916552E-01 |
| a14 | -1.164211E-02 | 7.884736E-03 | 3.535361E-02 | -3.956902E-02 | 7.178399E-02 |
| a16 | 4.699787E-03 | -2.447962E-02 | -4.990225E-02 | -9.951279E-02 | -2.577016E-01 |
| No. | 32 | 41 | 42 | 51 | 52 |
| K | 0 | 0 | 0 | 0 | 0 |
| a2 | 0 | 0 | 0 | 0 | 0 |
| a4 | -1.088121E-02 | 6.357581E-02 | 1.499567E-02 | -8.852553E-02 | -8.644819E-02 |
| a6 | 1.557760E-01 | -1.820272E-01 | -9.429086E-02 | 1.122850E-03 | 2.462685E-02 |
| a8 | -4.371195E-01 | 1.053926E-01 | 1.114685E-01 | 5.272124E-02 | -4.395560E-03 |
| a10 | 1.804139E-01 | 4.716080E-02 | -5.009144E-02 | -2.363445E-02 | 2.400193E-05 |
| a12 | 6.415036E-01 | -1.119753E-01 | -3.746550E-03 | -5.339955E-03 | 2.711866E-05 |
| a14 | -6.390078E-01 | 5.866019E-02 | 7.435036E-03 | 4.861617E-03 | 2.015104E-05 |
| a16 | 1.403397E-01 | -9.936874E-03 | -1.280665E-03 | -7.451236E-04 | -3.394265E-06 |

FIG. 23

| | Third Example | | | | | |
|---|---|---|---|---|---|---|
| | EFL=5.389 mm, HFOV=23.000 Degrees, TTL=5.247 mm, Fno=2.8, IMH=2.298 mm | | | | | |
| No. | | Curvature Radius | Ape. Stop Distance Lens Thickness Air Gap | | Refractive Index | Abbe No. | Focal Length |
| | Object | INFINITY | INFINITY | | | | |
| 80 | Ape. Stop | INFINITY | -0.378 | | | | |
| 11 | First Lens | 1.369 | 0.701 | $T_1$ | 1.545 | 55.987 | 4.618 |
| 12 | | 2.453 | 0.202 | $G_{12}$ | | | |
| 21 | Second Lens | 3.263 | 0.296 | $T_2$ | 1.661 | 20.412 | -5.997 |
| 22 | | 1.732 | 0.116 | $G_{23}$ | | | |
| 31 | Third Lens | 1.679 | 0.530 | $T_3$ | 1.545 | 55.987 | 5.738 |
| 32 | | 3.212 | 0.738 | $G_{34}$ | | | |
| 41 | Fourth Lens | -3.822 | 0.301 | $T_4$ | 1.545 | 55.987 | -8.560 |
| 42 | | -21.501 | 0.292 | $G_{45}$ | | | |
| 51 | Fifth Lens | 9.072 | 0.696 | $T_5$ | 1.661 | 20.412 | -22293.371 |
| 52 | | 8.788 | 0.450 | | | | |
| 70 | IR Filter | INFINITY | 0.210 | | 1.517 | 64.167 | |
| | | INFINITY | 0.715 | | | | |
| 71 | Image Plane | INFINITY | | | | | |

FIG. 24

| No. | 11 | 12 | 21 | 22 | 31 |
|---|---|---|---|---|---|
| K | 0 | 0 | 0 | 0 | 0 |
| a2 | 0 | 0 | 0 | 0 | 0 |
| a4 | -1.968271E-02 | -8.344241E-02 | -1.327023E-01 | -8.381356E-02 | -3.151637E-02 |
| a6 | 2.488075E-02 | 5.599352E-02 | 1.735098E-02 | -9.797469E-02 | -1.129666E-01 |
| a8 | -2.755028E-02 | -3.190722E-02 | 8.633802E-04 | 1.014920E-01 | 5.757053E-02 |
| a10 | 1.732971E-02 | -3.662256E-02 | -9.874530E-03 | 3.424648E-02 | -3.980251E-02 |
| a12 | 4.670764E-03 | 3.790097E-02 | 6.910495E-03 | 1.194263E-01 | 1.347287E-01 |
| a14 | -1.568491E-02 | -7.397616E-03 | 5.835296E-02 | -7.871292E-03 | 1.136467E-01 |
| a16 | 8.008214E-03 | 6.780469E-04 | -6.015003E-02 | -1.105810E-01 | -1.971168E-01 |
| No. | 32 | 41 | 42 | 51 | 52 |
| K | 0 | 0 | 0 | 0 | 0 |
| a2 | 0 | 0 | 0 | 0 | 0 |
| a4 | -2.024696E-02 | -2.182665E-02 | -0.011404084 | -0.071977693 | -0.08018242 |
| a6 | 2.042082E-01 | -1.916749E-01 | -0.130367601 | -0.015703909 | 0.019708579 |
| a8 | -4.390550E-01 | -8.825521E-04 | 0.109138085 | 0.03548298 | -0.00467962 |
| a10 | 1.415692E-01 | 1.420797E-01 | -0.059678229 | -0.015876429 | 9.91234E-05 |
| a12 | 6.921650E-01 | -1.368544E-01 | 0.008462217 | -0.006079275 | 7.33858E-05 |
| a14 | -7.196074E-01 | 3.953942E-02 | 0.009474578 | 0.005623926 | -2.8005E-05 |
| a16 | 1.931766E-01 | 1.614395E-02 | -0.003374832 | -0.000978942 | 7.23396E-06 |

FIG. 25

| No. | | Curvature Radius | Ape. Stop Distance Lens Thickness Air Gap | | Refractive Index | Abbe No. | Focal Length |
|---|---|---|---|---|---|---|---|
| | Fourth Example | | | | | | |
| | EFL=4.618 mm, HFOV=27.972 Degrees, TTL=4.614 mm, Fno=2.6, IMH=2.441 mm | | | | | | |
| | Object | INFINITY | INFINITY | | | | |
| 80 | Ape. Stop | INFINITY | -0.293 | | | | |
| 11 | First Lens | 1.393 | 0.513 | $T_1$ | 1.545 | 55.987 | 5.435 |
| 12 | | 2.282 | 0.040 | $G_{12}$ | | | |
| 21 | Second Lens | 2.515 | 0.220 | $T_2$ | 1.661 | 20.412 | -12.997 |
| 22 | | 1.881 | 0.044 | $G_{23}$ | | | |
| 31 | Third Lens | 1.964 | 0.248 | $T_3$ | 1.545 | 55.987 | 8.287 |
| 32 | | 3.314 | 1.236 | $G_{34}$ | | | |
| 41 | Fourth Lens | 148.942 | 0.504 | $T_4$ | 1.545 | 55.987 | 9.543 |
| 42 | | -5.396 | 0.660 | $G_{45}$ | | | |
| 51 | Fifth Lens | -3.050 | 0.248 | $T_5$ | 1.661 | 20.412 | -4.131 |
| 52 | | 29.598 | 0.450 | | | | |
| 70 | IR Filter | INFINITY | 0.210 | | 1.517 | 64.167 | |
| | | INFINITY | 0.243 | | | | |
| 71 | Image Plane | INFINITY | | | | | |

FIG. 26

| No. | 11 | 12 | 21 | 22 | 31 |
|---|---|---|---|---|---|
| K | 0 | 0 | 0 | 0 | 0 |
| a2 | 0 | 0 | 0 | 0 | 0 |
| a4 | -1.824003E-02 | -1.334631E-01 | -1.169508E-01 | -6.836722E-02 | -2.571433E-02 |
| a6 | 2.186071E-02 | 5.147596E-02 | 4.261922E-02 | -8.666308E-02 | -6.197067E-02 |
| a8 | -3.824058E-02 | -5.155295E-02 | 3.096672E-02 | 1.269914E-01 | 4.304194E-02 |
| a10 | 6.243253E-03 | -4.328337E-02 | -2.323937E-02 | -5.719336E-03 | -1.319648E-01 |
| a12 | -4.344892E-03 | 8.266383E-03 | -3.046658E-02 | 7.023302E-02 | 2.230071E-01 |
| a14 | -1.453279E-02 | 8.501828E-03 | 1.011841E-02 | -6.161582E-02 | 2.683762E-01 |
| a16 | 2.667637E-03 | 7.049142E-03 | 1.262967E-02 | -2.287720E-02 | -3.248323E-01 |
| No. | 32 | 41 | 42 | 51 | 52 |
| K | 0 | 0 | 0 | 0 | 0 |
| a2 | 0 | 0 | 0 | 0 | 0 |
| a4 | 7.122222E-02 | 1.516907E-02 | 1.153803E-01 | -0.025506127 | -0.096658105 |
| a6 | 2.158764E-01 | -4.763448E-02 | -1.423781E-01 | -0.006957874 | 0.028335615 |
| a8 | -3.986637E-01 | -7.207575E-02 | 1.139214E-01 | 0.035763751 | -0.006231791 |
| a10 | 2.296955E-01 | 1.354679E-01 | -6.202532E-02 | -0.017083697 | -0.000133646 |
| a12 | 6.985331E-01 | -1.179238E-01 | 3.722314E-03 | -0.006752385 | 0.000122076 |
| a14 | -8.924703E-01 | 4.304264E-02 | 8.101059E-03 | 0.005634638 | -3.32071E-06 |
| a16 | 3.551448E-01 | -4.196174E-03 | -1.913581E-03 | -0.000887361 | 7.34388E-06 |

FIG. 27

| Fifth Example ||||||
|---|---|---|---|---|---|
| EFL=5.254 mm, HFOV=23.363 Degrees, TTL=4.959 mm, Fno=2.6, IMH=2.293 mm ||||||
| No. | | Curvature Radius | Ape. Stop Distance Lens Thickness Air Gap | Refractive Index | Abbe No. | Focal Length |
| | Object | INFINITY | INFINITY | | | |
| 80 | Ape. Stop | INFINITY | -0.432 | | | |
| 11 | First Lens | 1.352 | 0.711 $T_1$ | 1.545 | 55.987 | 4.505 |
| 12 | | 2.444 | 0.118 $G_{12}$ | | | |
| 21 | Second Lens | 3.062 | 0.220 $T_2$ | 1.661 | 20.412 | -6.099 |
| 22 | | 1.697 | 0.065 $G_{23}$ | | | |
| 31 | Third Lens | 1.633 | 0.275 $T_3$ | 1.545 | 55.987 | 5.981 |
| 32 | | 3.069 | 1.308 $G_{34}$ | | | |
| 41 | Fourth Lens | -4.233 | 0.283 $T_4$ | 1.545 | 55.987 | -9.340 |
| 42 | | -25.425 | 0.187 $G_{45}$ | | | |
| 51 | Fifth Lens | 7.157 | 0.502 $T_5$ | 1.661 | 20.412 | -54.147 |
| 52 | | 5.806 | 0.450 | | | |
| 70 | IR Filter | INFINITY | 0.210 | 1.517 | 64.167 | |
| | | INFINITY | 0.631 | | | |
| 71 | Image Plane | INFINITY | | | | |

FIG. 28

| No. | 11 | 12 | 21 | 22 | 31 |
|---|---|---|---|---|---|
| K | 0 | 0 | 0 | 0 | 0 |
| a2 | 0 | 0 | 0 | 0 | 0 |
| a4 | -1.907192E-02 | -1.082677E-01 | -1.224908E-01 | -7.100205E-02 | -4.961573E-02 |
| a6 | 2.478227E-02 | 7.179842E-02 | 3.670987E-02 | -1.127032E-01 | -1.053379E-01 |
| a8 | -3.047922E-02 | -3.116340E-02 | 3.620880E-02 | 1.071329E-01 | -2.200420E-04 |
| a10 | 1.531024E-02 | -1.912252E-02 | 1.802660E-03 | 4.296510E-02 | -6.193952E-02 |
| a12 | 6.024104E-03 | 2.980295E-02 | -2.513479E-02 | 1.062327E-01 | 2.475490E-01 |
| a14 | -1.296958E-02 | 1.283071E-02 | 3.159573E-02 | -4.072749E-02 | 2.046695E-01 |
| a16 | 5.199686E-03 | -2.235986E-02 | -2.682550E-02 | -8.021944E-02 | -3.698410E-01 |
| No. | 32 | 41 | 42 | 51 | 52 |
| K | 0 | 0 | 0 | 0 | 0 |
| a2 | 0 | 0 | 0 | 0 | 0 |
| a4 | 1.265381E-02 | -4.513155E-02 | 4.312491E-02 | -0.046939664 | -0.088432305 |
| a6 | 2.151570E-01 | -5.457714E-02 | -1.356220E-01 | -0.014536364 | 0.021333098 |
| a8 | -4.193350E-01 | -9.600146E-02 | 1.096188E-01 | 0.032683854 | -0.005576964 |
| a10 | 1.716588E-01 | 1.251862E-01 | -6.659087E-02 | -0.016929407 | 9.51089E-05 |
| a12 | 6.875430E-01 | -1.217859E-01 | 3.913847E-03 | -0.006363451 | 6.3797E-05 |
| a14 | -7.388199E-01 | 4.284555E-02 | 9.193541E-03 | 0.005736769 | -1.95754E-05 |
| a16 | 1.934980E-01 | 5.346785E-03 | -1.798783E-03 | -0.000930486 | 9.98111E-06 |

FIG. 29

| Sixth Example |||||||
|---|---|---|---|---|---|---|
| EFL=5.304 mm, HFOV=24.166 Degrees, TTL=5.104 mm, Fno=2.46, IMH=2.437 mm |||||||
| No. | | Curvature Radius | Ape. Stop Distance Lens Thickness Air Gap | Refractive Index | Abbe No. | Focal Length |
| | Object | INFINITY | INFINITY | | | |
| 11 | First Lens | 1.355 | 0.629 $T_1$ | 1.545 | 55.987 | 4.616 |
| 12 | | 2.449 | 0 $G_{12}$ | | | |
| 80 | Ape. Stop | INFINITY | 0.125 | | | |
| 21 | Second Lens | 3.008 | 0.220 $T_2$ | 1.661 | 20.412 | -6.124 |
| 22 | | 1.682 | 0.065 $G_{23}$ | | | |
| 31 | Third Lens | 1.619 | 0.321 $T_3$ | 1.545 | 55.987 | 5.785 |
| 32 | | 3.087 | 1.423 $G_{34}$ | | | |
| 41 | Fourth Lens | -3.802 | 0.294 $T_4$ | 1.545 | 55.987 | -7.882 |
| 42 | | -33.359 | 0.115 $G_{45}$ | | | |
| 51 | Fifth Lens | 8.733 | 0.735 $T_5$ | 1.661 | 20.412 | -134.685 |
| 52 | | 7.691 | 0.450 | | | |
| 70 | IR Filter | INFINITY | 0.210 | 1.517 | 64.167 | |
| | | INFINITY | 0.517 | | | |
| 71 | Image Plane | INFINITY | | | | |

FIG. 30

| No. | 11 | 12 | 21 | 22 | 31 |
|---|---|---|---|---|---|
| K | 0 | 0 | 0 | 0 | 0 |
| a2 | 0 | 0 | 0 | 0 | 0 |
| a4 | -1.945019E-02 | -1.082801E-01 | -1.224347E-01 | -6.975739E-02 | -4.918392E-02 |
| a6 | 2.518025E-02 | 7.183219E-02 | 3.731628E-02 | -1.108030E-01 | -1.028604E-01 |
| a8 | -2.980474E-02 | -2.991744E-02 | 3.657233E-02 | 1.130043E-01 | 9.483445E-03 |
| a10 | 1.615363E-02 | -1.574022E-02 | 2.755208E-03 | 5.927847E-02 | -5.036423E-02 |
| a12 | 6.719159E-03 | 3.171493E-02 | -2.500800E-02 | 1.251235E-01 | 2.579583E-01 |
| a14 | -1.244298E-02 | 1.390217E-02 | 3.260809E-02 | -2.953324E-02 | 2.266376E-01 |
| a16 | 5.534888E-03 | -2.258781E-02 | -2.706843E-02 | -7.315112E-02 | -3.240114E-01 |
| No. | 32 | 41 | 42 | 51 | 52 |
| K | 0 | 0 | 0 | 0 | 0 |
| a2 | 0 | 0 | 0 | 0 | 0 |
| a4 | 1.034005E-02 | -5.057061E-02 | 0.037056143 | -0.040889664 | -0.082453827 |
| a6 | 2.148856E-01 | -4.243662E-02 | -0.129211143 | -0.014877132 | 0.023876737 |
| a8 | -4.259717E-01 | -8.409517E-02 | 0.111710663 | 0.032232586 | -0.004970367 |
| a10 | 1.587788E-01 | 1.290914E-01 | -0.066248075 | -0.01697654 | 4.41277E-05 |
| a12 | 6.859824E-01 | -1.184508E-01 | 0.003713162 | -0.006342253 | 5.44601E-05 |
| a14 | -7.225092E-01 | 4.449648E-02 | 0.009066993 | 0.005751928 | -2.47731E-05 |
| a16 | 2.421468E-01 | -1.117147E-04 | -0.001826273 | -0.000928987 | 6.59742E-06 |

FIG. 31

| | Seventh Example | | | | | |
|---|---|---|---|---|---|---|
| | EFL==5.213 mm, HFOV=28.046 Degrees, TTL=5.117 mm, Fno=2.9, IMH=2.909 mm | | | | | |
| No. | | Curvature Radius | Ape. Stop Distance Lens Thickness Air Gap | | Refractive Index | Abbe No. | Focal Length |
| | Object | INFINITY | INFINITY | | | | |
| 80 | Ape. Stop | INFINITY | -0.304 | | | | |
| 11 | First Lens | 1.385 | 0.827 | $T_1$ | 1.545 | 55.987 | 3.386 |
| 12 | | 4.346 | 0.080 | $G_{12}$ | | | |
| 21 | Second Lens | 5.396 | 0.338 | $T_2$ | 1.661 | 20.412 | -5.984 |
| 22 | | 2.237 | 0.204 | $G_{23}$ | | | |
| 31 | Third Lens | 1.896 | 0.283 | $T_3$ | 1.545 | 55.987 | 60.963 |
| 32 | | 1.905 | 1.027 | $G_{34}$ | | | |
| 41 | Fourth Lens | 47.468 | 0.558 | $T_4$ | 1.545 | 55.987 | 86.401 |
| 42 | | -8281.194 | 0.212 | $G_{45}$ | | | |
| 51 | Fifth Lens | 42.235 | 0.500 | $T_5$ | 1.642 | 22.409 | -9.640 |
| 52 | | 5.411 | 0.350 | | | | |
| 70 | IR Filter | INFINITY | 0.210 | | 1.517 | 64.167 | |
| | | INFINITY | 0.527 | | | | |
| 71 | Image Plane | INFINITY | | | | | |

FIG. 32

| No. | 11 | 12 | 21 | 22 | 31 |
|---|---|---|---|---|---|
| K | -2.070339E-02 | 0 | 0 | 1.225544E+00 | 5.888376E-01 |
| a2 | 0 | 0 | 0 | 0 | 0 |
| a4 | -2.720787E-02 | -4.168452E-01 | -5.860492E-01 | -5.556479E-01 | -5.623731E-01 |
| a6 | 8.373643E-02 | 8.712321E-01 | 1.720899E+00 | 2.048611E+00 | 1.090394E+00 |
| a8 | -2.617971E-01 | -4.738724E-01 | -1.815292E+00 | -3.438534E+00 | -2.910435E+00 |
| a10 | 4.432868E-01 | -1.199090E+00 | 4.073847E-02 | 4.488848E+00 | 7.636049E+00 |
| a12 | -4.803401E-01 | 1.984583E+00 | 1.329194E+00 | -5.349447E+00 | -1.324611E+01 |
| a14 | 2.854716E-01 | -1.158731E+00 | -9.442811E-01 | 5.069473E+00 | 1.202516E+01 |
| a16 | -8.043482E-02 | 2.458202E-01 | 1.951865E-01 | -2.188639E+00 | -4.382771E+00 |
| a18 | 0 | 0 | 0 | 0 | 0 |
| a20 | 0 | 0 | 0 | 0 | 0 |
| No. | 32 | 41 | 42 | 51 | 52 |
| K | 2.217442E-01 | -9.268320E+39 | 1.527304E+07 | 0 | -2.134397E+00 |
| a2 | 0 | 0 | 0 | 0 | 0 |
| a4 | -2.411804E-01 | 1.236896E-02 | 6.598991E-02 | -9.757553E-02 | -1.416786E-01 |
| a6 | 3.279466E-01 | -6.164401E-02 | -4.021296E-02 | 1.146335E-01 | 8.856573E-02 |
| a8 | -6.057886E-01 | 2.708412E-02 | 9.620269E-03 | -5.434901E-02 | -3.049008E-02 |
| a10 | 1.176296E+00 | -5.269613E-03 | -3.914310E-03 | 8.486998E-03 | 4.012987E-03 |
| a12 | -1.521992E+00 | 1.154024E-03 | 9.181887E-04 | 5.476741E-04 | 1.092150E-04 |
| a14 | 1.000825E+00 | -3.902594E-04 | 1.292322E-04 | -1.911002E-04 | -3.851931E-05 |
| a16 | -2.557359E-01 | 9.067998E-05 | -9.208160E-05 | -1.568150E-05 | -6.815171E-06 |
| a18 | 0 | -9.184252E-06 | 1.222170E-05 | 4.380936E-06 | 1.211715E-06 |
| a20 | 0 | 4.751668E-08 | -3.200252E-07 | -1.042999E-07 | -3.258900E-08 |

FIG. 33

| Example | 1st | 2nd | 3rd | 4th | 5th | 6th | 7th |
|---|---|---|---|---|---|---|---|
| T1 | 0.633 | 0.730 | 0.701 | 0.513 | 0.711 | 0.629 | 0.827 |
| G12 | 0.129 | 0.131 | 0.202 | 0.040 | 0.118 | 0.125 | 0.080 |
| T2 | 0.220 | 0.220 | 0.296 | 0.220 | 0.220 | 0.220 | 0.338 |
| G23 | 0.054 | 0.105 | 0.116 | 0.044 | 0.065 | 0.065 | 0.204 |
| T3 | 0.326 | 0.259 | 0.530 | 0.248 | 0.275 | 0.321 | 0.283 |
| G34 | 1.461 | 1.512 | 0.738 | 1.236 | 1.308 | 1.423 | 1.027 |
| T4 | 0.291 | 0.424 | 0.301 | 0.504 | 0.283 | 0.294 | 0.558 |
| G45 | 0.081 | 0.169 | 0.292 | 0.660 | 0.187 | 0.115 | 0.212 |
| T5 | 0.591 | 0.850 | 0.696 | 0.248 | 0.502 | 0.735 | 0.500 |
| G5F | 0.450 | 0.450 | 0.450 | 0.450 | 0.450 | 0.450 | 0.350 |
| TF | 0.210 | 0.210 | 0.210 | 0.210 | 0.210 | 0.210 | 0.210 |
| GFP | 0.392 | 0.388 | 0.715 | 0.243 | 0.631 | 0.517 | 0.527 |
| AAG | 1.726 | 1.916 | 1.349 | 1.980 | 1.677 | 1.727 | 1.523 |
| ALT | 2.062 | 2.483 | 2.524 | 1.732 | 1.990 | 2.199 | 2.506 |
| BFL | 1.052 | 1.048 | 1.375 | 0.903 | 1.291 | 1.177 | 1.087 |
| TTL | 4.840 | 5.447 | 5.247 | 4.614 | 4.959 | 5.104 | 5.117 |
| TL | 3.787 | 4.399 | 3.872 | 3.711 | 3.668 | 3.927 | 4.029 |
| EFL | 5.260 | 5.447 | 5.389 | 4.618 | 5.254 | 5.304 | 5.213 |

FIG. 34

| Example | 1st | 2nd | 3rd | 4th | 5th | 6th | 7th |
|---|---|---|---|---|---|---|---|
| TTL/EFL | 0.920 | 1.000 | 0.974 | 0.999 | 0.944 | 0.962 | 0.981 |
| TTL/G34 | 3.313 | 3.603 | 7.108 | 3.733 | 3.793 | 3.588 | 4.980 |
| ALT/T2 | 9.371 | 11.285 | 8.532 | 7.871 | 9.047 | 9.997 | 7.404 |
| (G45+T5)/T2 | 3.055 | 4.629 | 3.340 | 4.125 | 3.131 | 3.865 | 2.102 |
| TTL/(G45+T5) | 7.200 | 5.348 | 5.312 | 5.085 | 7.199 | 6.004 | 7.191 |
| T4/G45 | 3.600 | 2.514 | 1.029 | 0.764 | 1.512 | 2.562 | 2.634 |
| AAG/T2 | 7.844 | 8.709 | 4.559 | 8.999 | 7.625 | 7.852 | 4.500 |
| BFL/T3 | 3.230 | 4.050 | 2.592 | 3.648 | 4.693 | 3.670 | 3.840 |
| TL/T3 | 11.626 | 17.000 | 7.300 | 14.996 | 13.332 | 12.239 | 14.228 |
| AAG/T3 | 5.297 | 7.405 | 2.542 | 7.999 | 6.098 | 5.384 | 5.379 |
| TL/T5 | 6.406 | 5.175 | 5.567 | 14.995 | 7.307 | 5.340 | 8.064 |
| AAG/T5 | 2.919 | 2.254 | 1.939 | 7.999 | 3.342 | 2.349 | 3.048 |
| TTL/T1 | 7.645 | 7.458 | 7.485 | 8.999 | 6.977 | 8.115 | 6.190 |
| ALT/T1 | 3.256 | 3.399 | 3.600 | 3.377 | 2.800 | 3.497 | 3.032 |
| ALT/G34 | 1.411 | 1.642 | 3.419 | 1.401 | 1.522 | 1.546 | 2.439 |
| EFL/G34 | 3.600 | 3.603 | 7.300 | 3.736 | 4.018 | 3.728 | 5.074 |
| EFL/BFL | 4.998 | 5.198 | 3.920 | 5.114 | 4.069 | 4.505 | 4.794 |
| BFL/T4 | 3.610 | 2.474 | 4.571 | 1.792 | 4.570 | 4.003 | 1.949 |
| TL/BFL | 3.599 | 4.197 | 2.817 | 4.110 | 2.841 | 3.335 | 3.705 |
| (T1+G12+T2+G23+T3)/T5 | 2.305 | 1.700 | 2.653 | 4.299 | 2.767 | 1.849 | 3.467 |
| (T1+G12+T2+G23+T3)/T1 | 2.152 | 1.978 | 2.632 | 2.075 | 1.954 | 2.162 | 2.095 |
| (T1+G12+T2+G23+T3)/G34 | 0.933 | 0.956 | 2.500 | 0.861 | 1.062 | 0.956 | 1.686 |

FIG. 35

OPTICAL IMAGING LENS

CROSS REFERENCE TO RELATED APPLICATIONS

This application is a continuation of the application Ser. No. 15/893,710, filed on Feb. 12, 2018, which is a continuation of the application Ser. No. 15/650,968, filed on Jul. 16, 2017, which claims priority to Chinese Patent Application No. 201710411727.2, filed on Jun. 5, 2017. The contents thereof are included herein by reference.

BACKGROUND OF THE INVENTION

1. Field of the Invention

The present invention generally relates to an optical imaging lens. Specifically speaking, the present invention is directed to an optical imaging lens for use in a portable electronic device such as a mobile phone, a camera, a tablet personal computer, or a personal digital assistant (PDA) for taking pictures or for recording videos.

2. Description of the Prior Art

In recent years, the specification of the consumer's electronic products change all the time to keep on pursuing the improvements, even a telescopic function is introduced, so does the specification upgrade of the key components of those electronic products such as an optical imaging lens to meet the increasing demands. The most important features of an optical imaging lens are the imaging quality and the size. However, as far as the imaging quality is concerned, the demands for the better imaging quality are getting higher and higher owing to the consumers' request with the development of the image sensing technology. In addition to a smaller lens size, the imaging quality and the performance should be taken into consideration, too.

The designing of the optical lens is not just scaling down the optical lens which has good optical performance, but also needs to consider the material characteristics and to satisfy some practical requirements like assembly yield. Accordingly, it is more difficult to diminish a mini-lens than to diminish a conventional lens. Therefore, how to fabricate an optical imaging lens to meet the requirements of the consumer's electronic products as well as to constantly improve the imaging quality is always an important objective to research in this filed.

SUMMARY OF THE INVENTION

In the light of the above, examples in the present invention accordingly propose an optical imaging lens which is not only able to keep a good optical function, has reduced total length, technically possible but also has enhanced telescopic property. The optical imaging lens of five lens elements of examples in the present invention from an object side toward an image side in order along an optical axis has a first lens element, a second lens element, a third lens element, a fourth lens element and a fifth lens element. Each lens element from the first lens element to the fifth lens element respectively has an object-side surface which faces toward an object side to allow an imaging ray to pass through as well as an image-side surface which faces toward an image side to allow the imaging ray to pass through.

The image-side surface of the first lens element has a concave portion in a vicinity of the optical-axis. The object-side surface of the second lens element has a convex portion in a vicinity of the optical-axis. The image-side surface of the third lens element has a concave portion in a vicinity of the optical-axis. The fifth lens element has negative refractive power and a thickness of the fifth lens element along the optical-axis is larger than that of the second lens element. The optical imaging lens exclusively has the above five lens elements with refractive power. EFL is an effective focal length of the optical imaging lens, TTL is a distance from the object-side surface of the first lens element to an image plane, ALT is a total thickness of all five lens elements along the optical-axis, the second lens element has a second lens element thickness T2 and an air gap G34 is between the third lens element and the fourth lens element along the optical axis to satisfy TTL/EFL≤1.000, TTL/G34≤12.000 and ALT/T2≤12.900.

In the optical imaging lens of five lens elements of embodiments in the present invention, the fifth lens element has a fifth lens element thickness T5 along the optical axis and an air gap G45 is between the fourth lens element and the fifth lens element along the optical axis to satisfy (G45+T5)/T2≤4.800.

The optical imaging lens of five lens elements of examples in the present invention satisfies TTL/(G45+T5)≤7.200.

In the optical imaging lens of five lens elements of examples in the present invention, the fourth lens element has a fourth lens element thickness T4 along the optical axis to satisfy T4/G45≤3.600.

In the optical imaging lens of five lens elements of examples in the present invention, AAG is a sum of all four air gaps between each lens element from the first lens element to the fifth lens element to satisfy AAG/T2≤9.000.

In the optical imaging lens of five lens elements of examples in the present invention, BFL is a distance between the image-side surface of the fifth lens element and the image plane along the optical axis and the third lens element has a third lens element thickness T3 along the optical axis to satisfy BFL/T3≤5.600.

In the optical imaging lens of five lens elements of examples in the present invention, TL is a distance between the object-side surface of the first lens element and the image-side surface of the fifth lens element along the optical axis to satisfy TL/T3≤17.000.

The optical imaging lens of five lens elements of examples in the present invention satisfies AAG/T3≤8.000.

The optical imaging lens of five lens elements of examples in the present invention satisfies TL/T5≤15.000.

The optical imaging lens of five lens elements of examples in the present invention satisfies AAG/T5≤8.000.

In the optical imaging lens of five lens elements of examples in the present invention, the first lens element has a first lens element thickness T1 along the optical axis to satisfy TTL/T1≤9.000.

The optical imaging lens of five lens elements of examples in the present invention satisfies ALT/T1≤3.600.

The optical imaging lens of five lens elements of examples in the present invention satisfies ALT/G34≤3.900.

The optical imaging lens of five lens elements of examples in the present invention satisfies EFL/G34≤7.300.

The optical imaging lens of five lens elements of examples in the present invention satisfies EFL/BFL≤5.500.

The optical imaging lens of five lens elements of examples in the present invention satisfies BFL/T4≤5.100.

The optical imaging lens of five lens elements of examples in the present invention satisfies TL/BFL≤4.200.

The optical imaging lens of five lens elements of examples in the present invention satisfies, an air gap G12 is between the first lens element and the second lens element along the optical axis and an air gap G23 is between the second lens element and the third lens element along the optical axis to satisfy (T1+G12+T2+G23+T3)/T5≤4.300.

The optical imaging lens of five lens elements of examples in the present invention satisfies (T1+G12+T2+G23+T3)/T1≤2.700.

The optical imaging lens of five lens elements of examples in the present invention satisfies (T1+G12+T2+G23+T3)/G34≤2.500.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrates the methods for determining the surface shapes and for determining one region is a region in a vicinity of the optical axis or the region in a vicinity of its periphery of one lens element.

FIG. 6 illustrates a first example of the optical imaging lens of examples in the present invention.

FIG. 7A illustrates the longitudinal spherical aberration on the image plane of the first example.

FIG. 7B illustrates the astigmatic aberration on the sagittal direction of the first example.

FIG. 7C illustrates the astigmatic aberration on the tangential direction of the first example.

FIG. 7D illustrates the distortion aberration of the first example.

FIG. 8 illustrates a second example of the optical imaging lens of five lens elements of examples in the present invention.

FIG. 9A illustrates the longitudinal spherical aberration on the image plane of the second example.

FIG. 9B illustrates the astigmatic aberration on the sagittal direction of the second example.

FIG. 9C illustrates the astigmatic aberration on the tangential direction of the second example.

FIG. 9D illustrates the distortion aberration of the second example.

FIG. 10 illustrates a third example of the optical imaging lens of five lens elements of examples in the present invention.

FIG. 11A illustrates the longitudinal spherical aberration on the image plane of the third example.

FIG. 11B illustrates the astigmatic aberration on the sagittal direction of the third example.

FIG. 11C illustrates the astigmatic aberration on the tangential direction of the third example.

FIG. 11D illustrates the distortion aberration of the third example.

FIG. 14 illustrates a fifth example of the optical imaging lens of five lens elements of examples in the present invention.

FIG. 15A illustrates the longitudinal spherical aberration on the image plane of the fifth example.

FIG. 15B illustrates the astigmatic aberration on the sagittal direction of the fifth example.

FIG. 15C illustrates the astigmatic aberration on the tangential direction of the fifth example.

FIG. 15D illustrates the distortion aberration of the fifth example.

FIG. 16 illustrates a sixth example of the optical imaging lens of five lens elements of examples in the present invention.

FIG. 17A illustrates the longitudinal spherical aberration on the image plane of the sixth example.

FIG. 17B illustrates the astigmatic aberration on the sagittal direction of the sixth example.

FIG. 17C illustrates the astigmatic aberration on the tangential direction of the sixth example.

FIG. 17D illustrates the distortion aberration of the sixth example.

FIG. 20 shows the optical data of the first example of the optical imaging lens.

FIG. 21 shows the aspheric surface data of the first example.

FIG. 22 shows the optical data of the second example of the optical imaging lens.

FIG. 23 shows the aspheric surface data of the second example.

FIG. 24 shows the optical data of the third example of the optical imaging lens.

FIG. 25 shows the aspheric surface data of the third example.

FIG. 26 shows the optical data of the fourth example of the optical imaging lens.

FIG. 27 shows the aspheric surface data of the fourth example.

FIG. 28 shows the optical data of the fifth example of the optical imaging lens.

FIG. 29 shows the aspheric surface data of the fifth example.

FIG. 30 shows the optical data of the sixth example of the optical imaging lens.

FIG. 31 shows the aspheric surface data of the sixth example.

FIG. 32 shows the optical data of the seventh example of the optical imaging lens.

FIG. 33 shows the aspheric surface data of the seventh example.

FIG. 34 shows some important ratios in the examples.

FIG. 35 shows some important ratios in the examples.

DETAILED DESCRIPTION

Before the detailed description of the present invention, the first thing to be noticed is that in the present invention, similar (not necessarily identical) elements are labeled as the same numeral references. In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

Figures 1, 2:
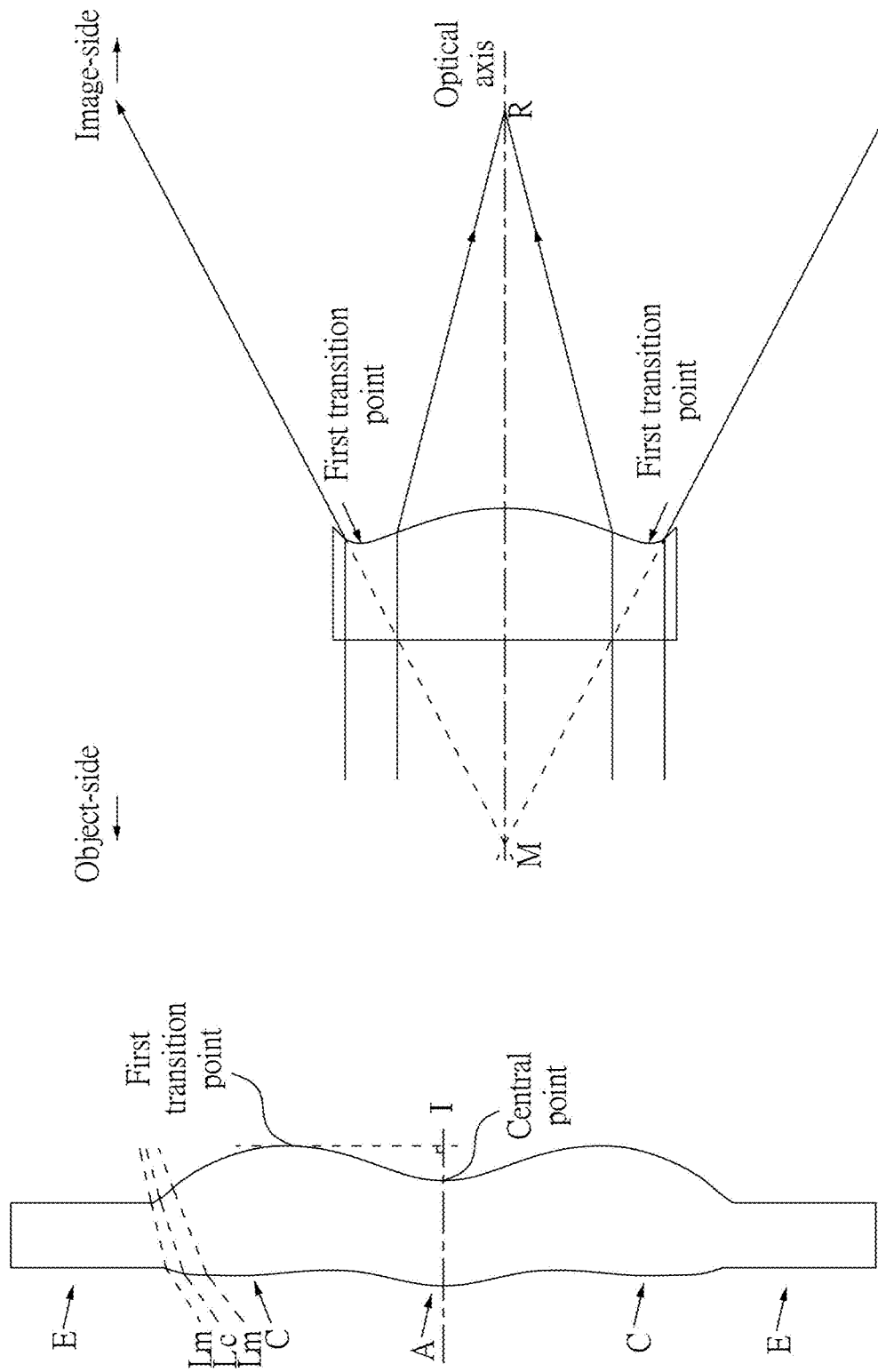

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

As shown in FIG. 6, the optical imaging lens 1 of five lens elements of examples in the present invention, sequentially located from an object side 2 (where an object is located) to an image side 3 along an optical axis 4, has a first lens element 10, a second lens element 20, a third lens element 30, a fourth lens element 40, a fifth lens element 50, a filter 70 and an image plane 71. Generally speaking, the first lens element 10, the second lens element 20, the third lens element 30, the fourth lens element 40 and the fifth lens element 50 may be made of a transparent plastic material but examples in the present invention are not limited to this, and each lens element has an appropriate refractive power. There are exclusively five lens elements, which means the first lens element 10, the second lens element 20, the third lens element 30, the fourth lens element 40 and the fifth lens element 50, with refractive power in the optical imaging lens 1 of examples in the present invention. The optical axis 4 is the optical axis of the entire optical imaging lens 1, and the optical axis of each of the lens elements coincides with the optical axis of the optical imaging lens 1.

Furthermore, the optical imaging lens 1 includes an aperture stop (ape. stop) 80 disposed in an appropriate position. In FIG. 6, the aperture stop 80 is disposed between the object side 2 and the first lens element 10. When light emitted or reflected by an object (not shown) which is located at the object side 2 enters the optical imaging lens 1 of examples in the present invention, it forms a clear and sharp image on the image plane 71 at the image side 3 after passing through the aperture stop 80, the first lens element 10, the second lens element 20, the third lens element 30, the fourth lens element 40, the fifth lens element 50, and the filter 70. In examples of the present invention, the optional filter 70 may be a filter of various suitable functions, for example, the filter 70 may be a cut filter of a specific wavelength, such as an infrared cut filter (IR cut filter), placed between the image-side surface 52 of the fifth lens element 50 and the image plane 71.

Each lens element in the optical imaging lens 1 of examples in the present invention has an object-side surface facing toward the object side 2 as well as an image-side surface facing toward the image side 3. In addition, each object-side surface and image-side surface in the optical imaging lens 1 of examples in the present invention has a portion (or region) in a vicinity of its periphery (periphery portion) away from the optical axis 4 as well as a portion in a vicinity of the optical axis (optical axis portion) close to the optical axis 4. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52. Each object-side surface and image-side surface has a periphery portion in a vicinity of its periphery away from the optical axis 4 as well as an optical axis portion in a vicinity of the optical axis close to the optical axis 4.

Each lens element in the optical imaging lens 1 of examples in the present invention further has a central thickness T on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5. Therefore, the total thickness of all the lens elements in the optical imaging lens 1 along the optical axis 4 is ALT=T1+T2+T3+T4+T5.

In addition, between two adjacent lens elements in the optical imaging lens 1 of examples in the present invention there may be an air gap along the optical axis 4. For example, there is an air gap G12 disposed between the first lens element 10 and the second lens element 20, an air gap G23 disposed between the second lens element 20 and the third lens element 30, an air gap G34 disposed between the third lens element 30 and the fourth lens element 40 as well as an air gap G45 disposed between the fourth lens element 40 and the fifth lens element 50. Therefore, the sum of total four air gaps between adjacent lens elements from the first lens element 10 to the fifth lens element 50 along the optical axis 4 is AAG=G12+G23+G34+G45.

In addition, the distance from the object-side surface 11 of the first lens element 10 to the image-side surface 52 of the fifth lens element 50 along the optical axis 4 is TL. The distance between the object-side surface 11 of the first lens element 10 to the image plane 71, namely the total length of the optical imaging lens along the optical axis 4 is TTL; the effective focal length of the optical imaging lens is EFL; the distance between the image-side surface 52 of the fifth lens element 50 and the image plane 71 along the optical axis 4 is BFL.

Furthermore, the focal length of the first lens element 10 is f1; the focal length of the second lens element 20 is f2; the focal length of the third lens element 30 is f3; the focal length of the fourth lens element 40 is f4; the focal length of the fifth lens element 50 is f5; the refractive index of the first lens element 10 is n1; the refractive index of the second lens element 20 is n2; the refractive index of the third lens element 30 is n3; the refractive index of the fourth lens element 40 is n4; the refractive index of the fifth lens element 50 is n5; the Abbe number of the first lens element 10 is v1; the Abbe number of the second lens element 20 is v2; the Abbe number of the third lens element 30 is v3; and the Abbe number of the fourth lens element 40 is v4; the Abbe number of the fifth lens element 50 is v5.

First Example

Please refer to FIG. 6 which illustrates the first example of the optical imaging lens 1 of the present invention. Please refer to FIG. 7A for the longitudinal spherical aberration on the image plane 71 of the first example; please refer to FIG. 7B for the astigmatic field aberration on the sagittal direction; please refer to FIG. 7C for the astigmatic field aberration on the tangential direction, and please refer to FIG. 7D for the distortion aberration. The Y axis of the spherical aberration in each example is "field of view" for 1.0. The Y axis of the astigmatic field and of the distortion in each example stands for the "image height, IMH", which is 2.264 mm.

The optical imaging lens 1 of the first example has five lens elements 10 to 50 with refractive power. The optical imaging lens 1 also has a filter 70, an aperture stop 80, and an image plane 71. The aperture stop 80 is provided between the object side 2 and the first lens element 10. The filter 70 may be used for preventing light of specific wavelength reaching the image plane to adversely affect the imaging quality.

The first lens element 10 has positive refractive power. The object-side surface 11 facing toward the object side 2 has a convex portion 13 in the vicinity of the optical axis and a convex portion 14 in a vicinity of its periphery. The image-side surface 12 facing toward the image side 3 has a concave portion 16 in the vicinity of the optical axis and a concave portion 17 in a vicinity of its periphery. Besides, both the object-side surface 11 and the image-side surface 12 of the first lens element 10 are aspherical surfaces.

The second lens element 20 has negative refractive power. The object-side surface 21 facing toward the object side 2 has a convex portion 23 in the vicinity of the optical axis 4 and a convex portion 24 in a vicinity of its periphery. The image-side surface 22 facing toward the image side 3 has a concave portion 26 in the vicinity of the optical axis 4 and a concave portion 27 in a vicinity of its periphery. Besides, both the object-side surface 21 and the image-side surface 22 of the second lens element 20 are aspherical surfaces.

The third lens element 30 has positive refractive power. The object-side surface 31 facing toward the object side 2 has a convex portion 33 in the vicinity of the optical axis and a convex portion 34 in a vicinity of its periphery. The image-side surface 32 facing toward the image side 3 has a concave portion 36 in the vicinity of the optical axis 4 and a concave portion 37 in a vicinity of its periphery. Besides, both the object-side surface 31 and the image-side surface 32 of the third lens element 30 are aspherical surfaces.

The fourth lens element 40 has negative refractive power. The object-side surface 41 facing toward the object side 2 has a concave portion 43 in the vicinity of the optical axis 4 and a concave portion 44 in a vicinity of its periphery. The image-side surface 42 facing toward the image side 3 has a concave portion 46 in the vicinity of the optical axis 4 and a convex portion 47 in a vicinity of its periphery. Besides, both the object-side surface 41 and the image-side surface 42 of the fourth lens element 40 are aspherical surfaces.

The fifth lens element 50 has negative refractive power. The object-side surface 51 facing toward the object side 2 has a convex portion 53 in the vicinity of the optical axis 4 and a concave portion 54 in a vicinity of its periphery. The image-side surface 52 facing toward the image side 3 has a concave portion 56 in the vicinity of the optical axis 4 and a convex portion 57 in a vicinity of its periphery. Besides, both the object-side surface 51 and the image-side surface 52 of the fifth lens element 50 are aspherical surfaces.

In the first lens element 10, the second lens element 20, the third lens element 30, the fourth lens element 40 and the fifth lens element 50 of the optical imaging lens element 1 of examples in the present invention, there are 10 surfaces, such as the object-side surfaces 11/21/31/41/51 and the image-side surfaces 12/22/32/42/52. If a surface is aspherical, these aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

In which:
R represents the curvature radius of the lens element surface;
Z represents the depth of an aspherical surface (the perpendicular distance between the point of the aspherical surface at a distance Y from the optical axis and the tangent plane of the vertex on the optical axis of the aspherical surface);
Y represents a vertical distance from a point on the aspherical surface to the optical axis;
K is a conic constant;
$a_i$ is the aspheric coefficient of the $i^{th}$ order.

The optical data of the first example of the optical imaging lens 1 are shown in FIG. 20 while the aspheric surface data are shown in FIG. 21. In the present examples of the optical imaging lens, the f-number of the entire optical lens element system is Fno, EFL is the effective focal length, HFOV stands for the half field of view which is half of the field of view of the entire optical imaging lens 1, and the unit for the curvature radius, the thickness and the focal length is in millimeters (mm). TTL is 4.840 mm. Fno is 3. The image height (IMH) is 2.264 mm. HFOV is 23.000 degrees.

Second Example

Please refer to FIG. 8 which illustrates the second example of the optical imaging lens 1 of the present invention. It is noted that from the second example to the following examples, in order to simplify the figures, only the components different from what the first example has, and the basic lens elements will be labeled in figures. Other components that are the same as what the first example has, such as the object-side surface, the image-side surface, the portion in a vicinity of the optical axis and the portion in a vicinity of its periphery will be omitted in the following examples. Please refer to FIG. 9A for the longitudinal spherical aberration on the image plane 71 of the second example, please refer to FIG. 9B for the astigmatic aberration on the sagittal direction, please refer to FIG. 9C for the astigmatic aberration on the tangential direction, and please refer to FIG. 9D for the distortion aberration. The components in the second example are similar to those in the first example, but the optical data such as the curvature radius, the refractive power, the lens thickness, the lens focal length, the aspheric surface or the back focal length in this example are different from the optical data in the first example, and in the second example, the object-side surface 41 of the fourth lens element 40 has a convex portion 43' in the vicinity of the optical axis 4.

The optical data of the second example of the optical imaging lens are shown in FIG. 22 while the aspheric surface data are shown in FIG. 23. TTL is 5.447 mm. Fno is 2.8. The image height is 2.443 mm. HFOV is 24.263 degrees. In particular: 1) the aberration of the second example is better than that of the first example of the present invention, 2) the Fno of the second example is smaller than that of the first example of the present invention, 3) the fabrication of the second example is easier than the first example so the yield is better.

Third Example

Please refer to FIG. 10 which illustrates the third example of the optical imaging lens 1 of the present invention. Please refer to FIG. 11A for the longitudinal spherical aberration on the image plane 71 of the third example; please refer to FIG. 11B for the astigmatic aberration on the sagittal direction; please refer to FIG. 11C for the astigmatic aberration on the tangential direction, and please refer to FIG. 11D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the image-side surface 42 of the fourth lens element 40 has a convex portion 46' in the vicinity of the optical axis 4.

The optical data of the third example of the optical imaging lens are shown in FIG. 24 while the aspheric surface data are shown in FIG. 25. TTL is 5.247 mm. Fno is 2.8. The image height is 2.298 mm. HFOV is 23.000 degrees. In particular: 1) the aberration of the third example is better than that of the first example of the present invention, 2) the Fno of the third example is smaller than that of the first example of the present invention, 3) the fabrication of the third example is easier than the first example so the yield is better.

Fourth Example

Figure 12:
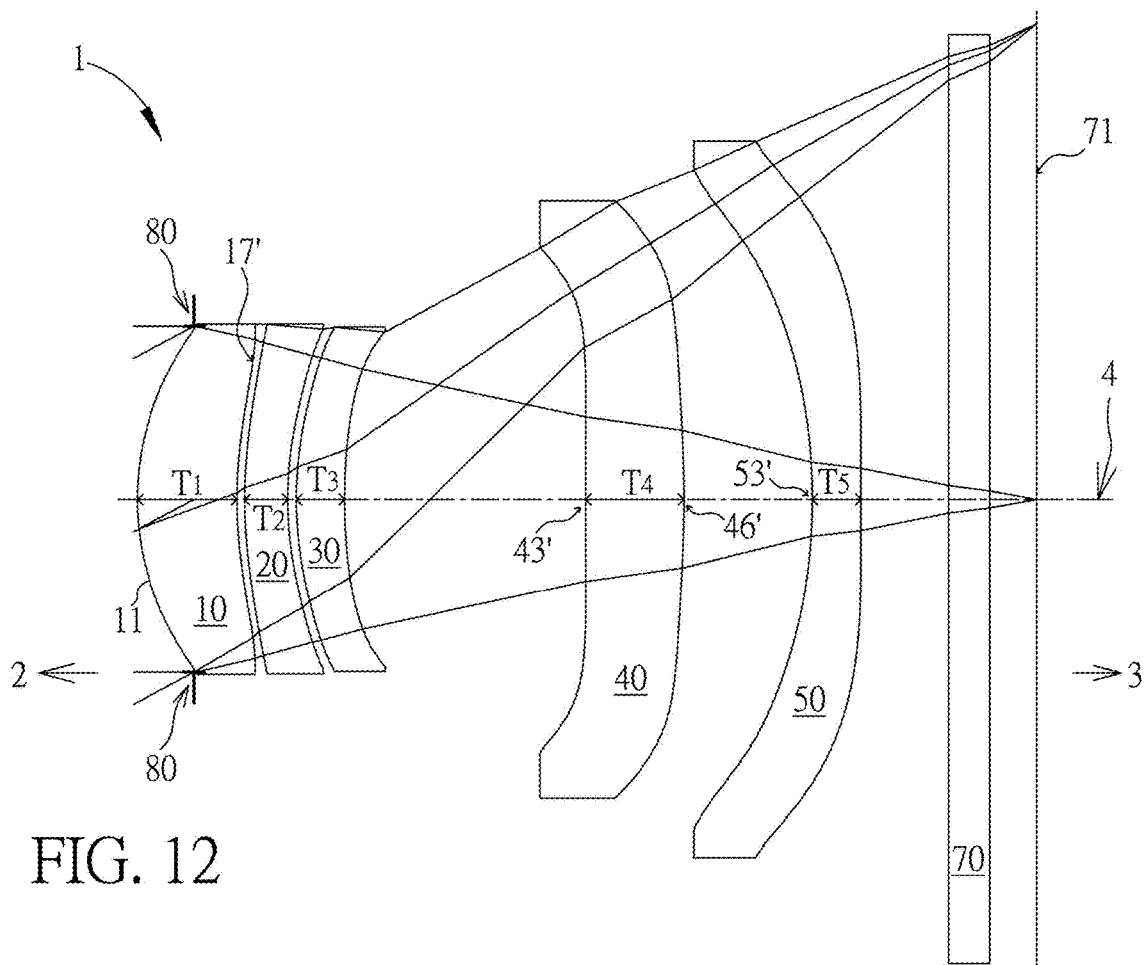
FIG. 12 illustrates a fourth example of the optical imaging lens of five lens elements of examples in the present invention.
Figures 13A, 13B, 13C, 13D:
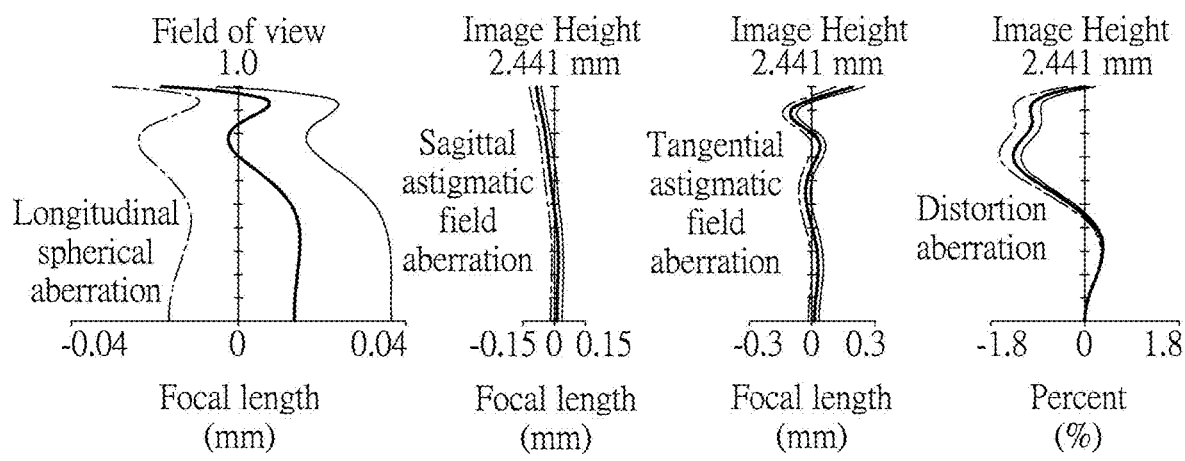
FIG. 13A illustrates the longitudinal spherical aberration on the image plane of the fourth example.
FIG. 13B illustrates the astigmatic aberration on the sagittal direction of the fourth example.
FIG. 13C illustrates the astigmatic aberration on the tangential direction of the fourth example.
FIG. 13D illustrates the distortion aberration of the fourth example.

Please refer to FIG. 12 which illustrates the fourth example of the optical imaging lens 1 of the present invention. Please refer to FIG. 13A for the longitudinal spherical aberration on the image plane 71 of the fourth example; please refer to FIG. 13B for the astigmatic aberration on the sagittal direction; please refer to FIG. 13C for the astigmatic aberration on the tangential direction, and please refer to FIG. 13D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the image-side surface 12 of the first lens element 10 has a convex portion 17' in a vicinity of its periphery, the fourth lens element 40 has positive refractive power, the object-side surface 41 of the fourth lens element 40 has a convex portion 43' in the vicinity of the optical axis 4, the image-side surface 42 of the fourth lens element 40 has a convex portion 46' in the vicinity of the optical axis 4 and the object-side surface 51 of the fifth lens element 50 has a concave portion 53' in the vicinity of the optical axis 4.

The optical data of the fourth example of the optical imaging lens are shown in FIG. 26 while the aspheric surface data are shown in FIG. 27. TTL is 4.614 mm. Fno is 2.6. The image height is 2.441 mm. HFOV is 27.972 degrees. In particular: 1) the TTL of the fourth example is shorter than that of the first example of the present invention, 2) the aberration of the fourth example is better than that of the first example of the present invention, 3) the Fno of the fourth example is smaller than that of the first example of the present invention, 4) the fabrication of the fourth example is easier than the first example so the yield is better.

Fifth Example

Please refer to FIG. 14 which illustrates the fifth example of the optical imaging lens 1 of the present invention. Please refer to FIG. 15A for the longitudinal spherical aberration on the image plane 71 of the fifth example; please refer to FIG. 15B for the astigmatic aberration on the sagittal direction; please refer to FIG. 15C for the astigmatic aberration on the tangential direction, and please refer to FIG. 15D for the distortion aberration. The components in the fifth example are similar to those in the first example, but the optical data such as the curvature radius, the refractive power, the lens thickness, the lens focal length, the aspheric surface or the back focal length in this example are different from the optical data in the first example, and in the fifth example, the image-side surface 42 of the fourth lens element 40 has a convex portion 46' in the vicinity of the optical axis 4.

The optical data of the fifth example of the optical imaging lens are shown in FIG. 28 while the aspheric surface data are shown in FIG. 29. TTL is 4.959 mm. Fno is 2.6. The image height is 2.293 mm. HFOV is 23.363 degrees. In particular: 1) the aberration of the fifth example is better than that of the first example of the present invention, 2) the Fno of the fifth example is smaller than that of the first example of the present invention, 3) the fabrication of the fifth example is easier than the first example so the yield is better.

Sixth Example

Please refer to FIG. 16 which illustrates the sixth example of the optical imaging lens 1 of the present invention. Please refer to FIG. 17A for the longitudinal spherical aberration on the image plane 71 of the sixth example; please refer to FIG. 17B for the astigmatic aberration on the sagittal direction; please refer to FIG. 17C for the astigmatic aberration on the tangential direction, and please refer to FIG. 17D for the distortion aberration. The components in the sixth example are similar to those in the first example, but the optical data such as the curvature radius, the refractive power, the lens thickness, the lens focal length, the aspheric surface or the back focal length in this example are different from the optical data in the first example, and in this example, the aperture stop 80 is disposed between the first lens element 10 and the second lens element 20 and the image-side surface 42 of the fourth lens element 40 has a convex portion 46' in the vicinity of the optical axis 4.

The optical data of the sixth example of the optical imaging lens are shown in FIG. 30 while the aspheric surface data are shown in FIG. 31. TTL is 5.104 mm. Fno is 2.46. The image height is 2.437 mm. HFOV is 24.166 degrees. In particular: 1) the aberration of the sixth example is better than that of the first example of the present invention, 2) the Fno of the sixth example is smaller than that of the first example of the present invention, 3) the sixth example shows the aperture stop 80 disposed in a rear position to have larger field of view and better imaging quality, 4) the fabrication of the sixth example is easier than the first example so the yield is better.

Seventh Example

Figure 18:
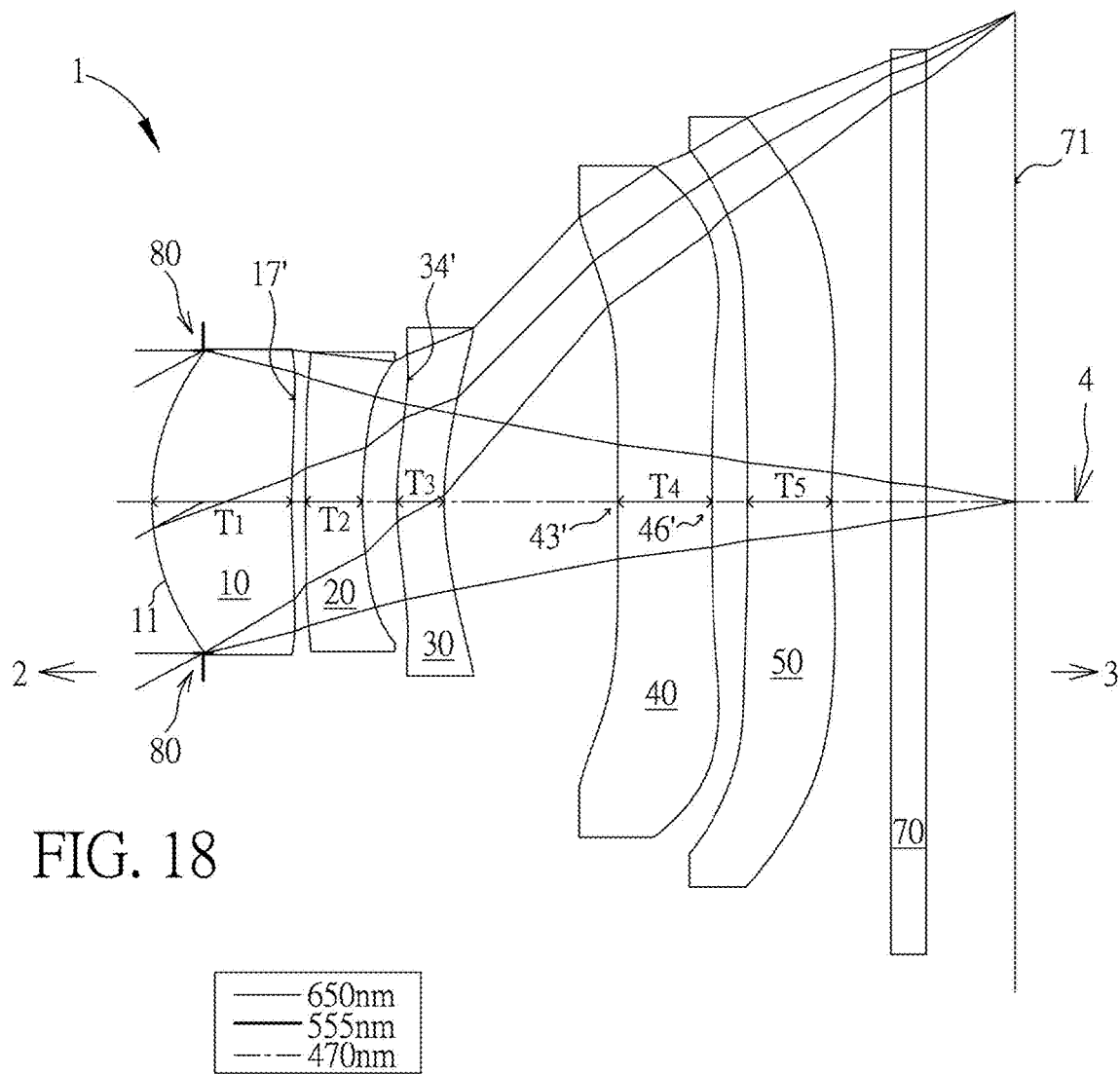
FIG. 18 illustrates a seventh example of the optical imaging lens of five lens elements of examples in the present invention.
Figure 19A:
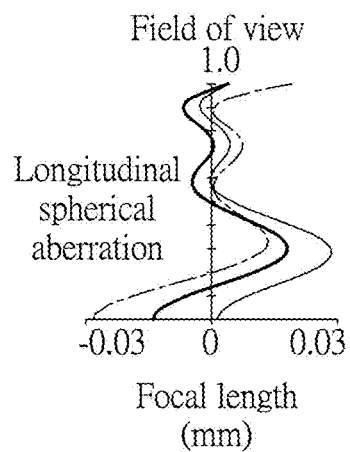
FIG. 19A illustrates the longitudinal spherical aberration on the image plane of the seventh example.
Figure 19B:
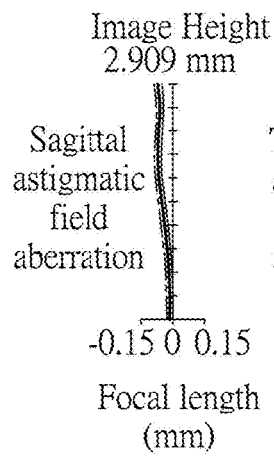
FIG. 19B illustrates the astigmatic aberration on the sagittal direction of the seventh example.
Figure 19C:
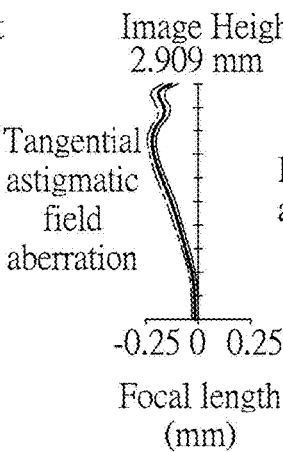
FIG. 19C illustrates the astigmatic aberration on the tangential direction of the seventh example.
Figure 19D:
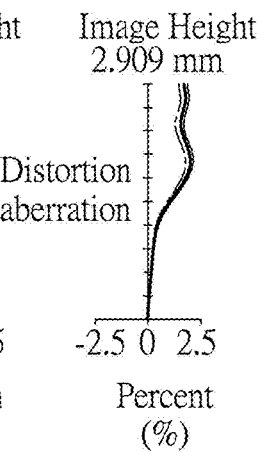
FIG. 19D illustrates the distortion aberration of the seventh example.

Please refer to FIG. 18 which illustrates the seventh example of the optical imaging lens 1 of the present invention. Please refer to FIG. 19A for the longitudinal spherical aberration on the image plane 71 of the seventh example; please refer to FIG. 19B for the astigmatic aberration on the sagittal direction; please refer to FIG. 19C for the astigmatic aberration on the tangential direction, and please refer to FIG. 19D for the distortion aberration. The components in the seventh example are similar to those in the first example, but the optical data such as the curvature radius, the refractive power, the lens thickness, the lens focal length, the aspheric surface or the back focal length in this example are different from the optical data in the first example, and in this example, the image-side surface 12 of the first lens element 10 has a convex portion 17' in a vicinity of its periphery, the object-side surface 31 of the third lens element 30 has a concave portion 34' in a vicinity of its periphery, the fourth lens element 40 has positive refractive power, the object-side surface 41 of the fourth lens element 40 has a convex portion 43' in the vicinity of the optical axis 4 and the image-side surface 42 of the fourth lens element 40 has a convex portion 46' in the vicinity of the optical axis 4.

The optical data of the seventh example of the optical imaging lens are shown in FIG. 32 while the aspheric surface data are shown in FIG. 33. TTL is 5.117 mm. Fno is 2.9. The image height is 2.909 mm. HFOV is 28.046 degrees. In particular: 1) the Fno of the seventh example is smaller than that of the first example of the present invention, 2) the fabrication of the seventh example is easier than the first example so the yield is better.

Some important ratios in each example are shown in FIG. 34 and in FIG. 35. The distance between the image-side surface 52 of the fifth lens element 50 to the filter 70 along the optical axis 4 is G5F; the thickness of the filter 70 along the optical axis 4 is TF; the distance between the filter 70 to the image plane 71 along the optical axis 4 is GFP; the distance between the image-side surface 52 of the fifth lens element 50 and the image plane 71 along the optical axis 4 is BFL. Therefore, BFL=G5F+TF+GFP.

In the light of the above examples, the inventors observe at least the following features of the optical imaging lens arrangement of examples in the present invention and the corresponding efficacy:

1. The first lens element has an image-side surface with a concave portion in a vicinity of its optical-axis and the second lens element has an object-side surface with a convex portion in a vicinity of its optical-axis together to help the collection of the imaging light.
2. The third lens element has an image-side surface with a concave portion in a vicinity of its optical-axis to facilitate the correction the aberration which is caused by the first lens element and by the second lens element.
3. The fifth lens element has negative refractive power to facilitate the correction the aberration which is caused by the first lens element to the fourth lens element.
4. The fifth lens element has a thickness along its optical-axis larger than the thickness of the second lens along its optical-axis to facilitate the fabrication and processing of the fifth lens element and the assembly of the optical imaging lens.
5. The combination of the above designs is able to effectively reduce the lens length, to ensure good imaging quality and to enhance the telescopic property of the resultant optical imaging lens.

In addition, by controlling the values of the following parameters, it helps the designers to obtain a better optical performance, reduced total length and a technically possible optical imaging lens. For example:

(A) To reduce the total length, the present invention proposes to properly reduce the lens thickness and the air gaps. When the assembly of the optical imaging lens and the imaging quality are taken into consideration, the lens thickness and the air gaps need to go with each other or to adjust a specific optical parameter in a specific combination. The following conditional formulae are provided to keep the optical parameters in a suitable range to obtain a better arrangement.

1. $ALT/T1 \leq 3.600$, preferably $2.800 \leq ALT/T1 \leq 3.600$.
2. $ALT/G34 \leq 3.900$, preferably $1.400 \leq ALT/G34 \leq 3.900$.
3. $(T1+G12+T2+G23+T3)/T1 \leq 2.700$, preferably $1.900 \leq (T1+G12+T2+G23+T3)/T1 \leq 2.700$.
4. $(T1+G12+T2+G23+T3)/G34 \leq 2.500$, preferably $0.800 \leq (T1+G12+T2+G23+T3)/G34 \leq 2.500$.

(B) It helps to increase the telescopic property and is easier for the application of a smaller optical imaging lens in a mobile phone the when the thickness of an optical system reduces if the following conditions are met.

1. $TTL/EFL \leq 1.000$, preferably $0.800 \leq TTL/EFL \leq 1.000$.
2. $EFL/G34 \leq 7.300$, preferably $3.600 \leq EFL/G34 \leq 7.300$.
3. $EFL/BFL \leq 5.500$, preferably $2.300 \leq EFL/BFL \leq 5.500$.

(C) The optical parameters and the lens length are kept in a suitable range so the parameters are not too small to fabricate or to assemble the optical imaging lens set or so great to jeopardize the decrease in total length of the optical imaging lens 1.

1. $TTL/EFL \leq 1.000$, preferably $0.800 \leq TTL/EFL \leq 1.000$.
2. $TTL/G34 \leq 12.000$, preferably $2.500 \leq TTL/G34 \leq 12.000$.
3. $TTL/(G45+T5) \leq 7.200$, preferably $2.100 \leq TTL/(G45+T5) \leq 7.200$.
4. $TL/T3 \leq 17.000$, preferably $7.300 \leq TL/T3 \leq 17.000$.
5. $TL/T5 \leq 15.000$, preferably $4.900 \leq TL/T5 \leq 15.000$.
6. $TTL/T1 \leq 9.000$, preferably $6.100 \leq TTL/T1 \leq 9.000$.
7. $TL/BFL \leq 4.200$, preferably $1.600 \leq TL/BFL \leq 4.200$.

(D) By limiting the optical parameters and the second lens element thickness T2, the second lens element thickness T2 is not so large or so small to facilitate the reduction of the optical aberration cause by the first lens element.

1. $ALT/T2 \leq 12.900$, preferably $7.400 \leq ALT/T2 \leq 12.900$.
2. $(G45+T5)/T2 \leq 4.800$, preferably $2.100 \leq (G45+T5)/T2 \leq 4.800$.
3. $AAG/T2 \leq 9.000$, preferably $4.500 \leq AAG/T2 \leq 9.000$.

(E) By limiting the third lens element thickness T3 and other air gaps, the third lens element thickness T3 is not so large or so small to facilitate the reduction of the optical aberration cause by the first lens element and by the second lens element.

1. $BFL/T3 \leq 5.600$, preferably $2.500 \leq BFL/T3 \leq 5.600$.
2. $AAG/T3 \leq 8.000$, preferably $2.400 \leq AAG/T3 \leq 8.000$.

(F) By limiting the fourth lens element thickness T4 and other air gaps or lens thickness, the fourth lens element thickness T4 is not so large or so small to facilitate the reduction of the optical aberration cause by the first lens element, by the second lens element and by the third lens element.

1. $T4/G45 \leq 3.600$, preferably $0.300 \leq T4/G45 \leq 3.600$.
2. $BFL/T4 \leq 5.100$, preferably $1.500 \leq BFL/T4 \leq 5.100$.

(G) By limiting the fifth lens element thickness T5 and other air gaps or lens thickness, the fifth lens element thickness T5 is not so large or so small to facilitate the reduction of the optical aberration which is cause by the first lens element, by the second lens element, by the third lens element and by the fourth lens element.

1. $AAG/T5 \leq 8.000$, preferably $1.800 \leq AAG/T5 \leq 8.000$.
2. $(T1+G12+T2+G23+T3)/T5 \leq 4.300$, preferably $1.700 \leq (T1+G12+T2+G23+T3)/T5 \leq 4.300$.

In each one of the above examples, the longitudinal spherical aberration, the astigmatic aberration and the distortion aberration meet requirements in use. By observing three representative wavelengths of red, green and blue, it is suggested that all curves of every wavelength are close to one another, which reveals off-axis light of different heights of every wavelength all concentrates on the image plane, and deviations of every curve also reveal that off-axis light of different heights are well controlled so the examples do improve the spherical aberration, the astigmatic aberration and the distortion aberration. In addition, by observing the imaging quality data the distances amongst the three representing different wavelengths red, green and blue, are pretty close to one another, which means examples in the present invention are able to concentrate light of the three representing different wavelengths so that the chromatic dispersion is greatly inhibited. Given the above, examples in the present invention provide outstanding imaging quality.

In the light of the unpredictability of the optical imaging lens, examples in the present invention suggest the above principles to have a shorter total length of the optical imaging lens, a larger aperture available, better imaging quality or a better fabrication yield to overcome the drawbacks of prior art.

The max values or the min values of optional combinations of the above optical parameters are within the ranges of examples in the present invention for the practice of examples in the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens comprising first, second, third, fourth and fifth lens elements arranged from an object side to an image side in the given order along an optical axis of said imaging lens, each of said first, second, third, fourth and fifth lens elements having an object-side surface facing toward the object side and an image-side surface facing toward the image side, wherein:
    said image-side surface of said first lens element has a concave portion in a vicinity of the optical axis of said first lens element;
    said second lens element has negative refractive power;
    said object-side surface of said third lens element has a convex portion in a vicinity of the optical axis of said third lens element and said image-side surface of said third lens element has a concave portion in a vicinity of a periphery of said third lens element;
    said fifth lens element has negative refractive power and said image-side surface of said fifth lens element has a concave portion in a vicinity of the optical axis of said fifth lens element;
    the optical imaging lens comprises no other lenses having refracting power beyond the five lens elements;
    a sum of the Abbe number of said second lens element, the Abbe number of said third lens element and the Abbe number of said fourth lens element is greater than or equal to twice of the Abbe number of said first lens element; and
    EFL is an effective focal length of said optical imaging lens, TTL is a distance from said object-side surface of said first lens element to an image plane to satisfy TTL/EFL≤1.000.

2. The optical imaging lens as claimed in claim 1, satisfying 0.770≤(G23+T1)/(T2+T4)≤1.542, where an air gap G23 is between said second lens element and said third lens element along said optical axis, said first lens element has a first lens element thickness T1 along said optical axis, said second lens element has a second lens element thickness T2 along said optical axis and said fourth lens element has a fourth lens element thickness T4 along said optical axis.

3. The optical imaging lens as claimed in claim 1, satisfying (T1+G12+T2+G23+T3)/T5≤4.300, where said first lens element has a first lens element thickness T1 along said optical axis, an air gap G12 is between said first lens element and said second lens element along said optical axis, said second lens element has a second lens element thickness T2 along said optical axis, an air gap G23 is between said second lens element and said third lens element along said optical axis, said third lens element has a third lens element thickness T3 along said optical axis and said fifth lens element has a fifth lens element thickness T5 along said optical axis.

4. The optical imaging lens as claimed in claim 1, satisfying 1.507≤(G45+T3+T4+T5)/(T1+G23)≤2.980, where an air gap G45 is between said fourth lens element and said fifth lens element along said optical axis, said third lens element has a third lens element thickness T3 along said optical axis, said fourth lens element has a fourth lens element thickness T4 along said optical axis, said fifth lens element has a fifth lens element thickness T5 along said optical axis, said first lens element has a first lens element thickness T1 along said optical axis and an air gap G23 is between said second lens element and said third lens element along said optical axis.

5. The optical imaging lens as claimed in claim 1, satisfying EFL/G34≤7.300, where an air gap G34 is between said third lens element and said fourth lens element along said optical axis.

6. The optical imaging lens as claimed in claim 1, satisfying 2.334≤EFL/AAG≤3.998, where AAG is a sum of all four air gaps between each lens element from said first lens element to said fifth lens element.

7. The optical imaging lens as claimed in claim 1, satisfying 0.779≤(T1+T3+T5)/(G23+G34)≤2.256, where said first lens element has a first lens element thickness T1, said third lens element has a third lens element thickness T3 along said optical axis, said fifth lens element has a fifth lens element thickness T5 along said optical axis, an air gap G23 is between said second lens element and said third lens element along said optical axis and an air gap G34 is between said third lens element and said fourth lens element along said optical axis.

8. An optical imaging lens comprising first, second, third, fourth and fifth lens elements arranged from an object side to an image side in the given order along an optical axis of said imaging lens, each of said first, second, third, fourth and fifth lens elements having an object-side surface facing toward the object side and an image-side surface facing toward the image side, wherein:
    said image-side surface of said first lens element has a concave portion in a vicinity of the optical axis of said first lens element;
    said second lens element has negative refractive power;
    said image-side surface of said third lens element has a concave portion in a vicinity of a periphery of said third lens element;
    said fifth lens element has negative refractive power, said object-side surface of said fifth lens element has a concave portion in a vicinity of a periphery of said fifth lens element and said image-side surface of said fifth lens element has a concave portion in a vicinity of the optical axis of said fifth lens element;

the optical imaging lens comprises no other lenses having refracting power beyond the five lens elements;

a sum of the Abbe number of said second lens element, the Abbe number of said third lens element and the Abbe number of said fourth lens element is greater than or equal to twice of the Abbe number of said first lens element; and EFL is an effective focal length of said optical imaging lens, TTL is a distance from said object-side surface of said first lens element to an image plane to satisfy TTL/EFL≤1.000.

9. The optical imaging lens as claimed in claim 8, satisfying 1.047≤(G34+T2)/(G45+T5)≤2.217, where an air gap G34 is between said third lens element and said fourth lens element along said optical axis, said second lens element has a second lens element thickness T2 along said optical axis, an air gap G45 is between said fourth lens element and said fifth lens element along said optical axis and said fifth lens element has a fifth lens element thickness T5 along said optical axis.

10. The optical imaging lens as claimed in claim 8, satisfying (T1+G12+T2+G23+T3)/T1≤2.700, where said first lens element has a first lens element thickness T1 along said optical axis, an air gap G12 is between said first lens element and said second lens element along said optical axis, said second lens element has a second lens element thickness T2 along said optical axis, an air gap G23 is between said second lens element and said third lens element along said optical axis and said third lens element has a third lens element thickness T3 along said optical axis.

11. The optical imaging lens as claimed in claim 8, satisfying 2.760≤TL/G34≤5.246, where TL is a distance between said object-side surface of said first lens element and said image-side surface of said fifth lens element along said optical axis and an air gap G34 is between said third lens element and said fourth lens element along said optical axis.

12. The optical imaging lens as claimed in claim 8, satisfying 2.056≤(AAG+T1)/(T4+T5)≤3.315, where AAG is a sum of all four air gaps between each lens element from said first lens element to said fifth lens element, said first lens element has a first lens element thickness T1 along said optical axis, said fourth lens element has a fourth lens element thickness T4 along said optical axis and said fifth lens element has a fifth lens element thickness T5 along said optical axis.

13. The optical imaging lens as claimed in claim 8, satisfying 2.332≤(BFL+TL)/AAG≤3.892, where BFL is a distance between said image-side surface of said fifth lens element and said image plane along said optical axis, TL is a distance between said object-side surface of said first lens element and said image-side surface of said fifth lens element along said optical axis and AAG is a sum of all four air gaps between each lens element from said first lens element to said fifth lens element.

14. The optical imaging lens as claimed in claim 8, satisfying 2.152≤(G34+T4+G45+T5)/(T2+G23+T3)≤5.172, where an air gap G34 is between said third lens element and said fourth lens element along said optical axis, said fourth lens element has a fourth lens element thickness T4 along said optical axis, an air gap G45 is between said fourth lens element and said fifth lens element along said optical axis, said fifth lens element has a fifth lens element thickness T5 along said optical axis, said second lens element has a second lens element thickness T2, an air gap G23 is between said second lens element and said third lens element along said optical axis and said third lens element has a third lens element thickness T3 along said optical axis.

15. An optical imaging lens comprising first, second, third, fourth and fifth lens elements arranged from an object side to an image side in the given order along an optical axis of said imaging lens, each of said first, second, third, fourth and fifth lens elements having an object-side surface facing toward the object side and an image-side surface facing toward the image side, wherein:

said image-side surface of said first lens element has a concave portion in a vicinity of the optical axis of said first lens element; said second lens element has negative refractive power.

said object-side surface of said third lens element has a convex portion a periphery of said third lens element and said image-side surface of said third lens element has a concave portion a periphery of said third lens element;

said image-side surface of said fourth lens element has a convex portion in a vicinity of a the optical axis of said fourth lens element and said image-side surface of said fourth lens element has a convex portion in a vicinity of a periphery of said fourth lens element;

said object-side surface of said fifth lens element has a convex portion in a vicinity of the optical axis of said fifth lens element;

the optical imaging lens comprises no other lenses having refracting power beyond the five lens elements;

a sum of the Abbe number of said third lens element, the Abbe number of said fourth lens element and the Abbe number of said fifth lens element is greater than or equal to twice of the Abbe number of said first lens element; and EFL is an effective focal length of said optical imaging lens, TTL is a distance from said object-side surface of said first lens element to an image plane to satisfy TTL/EFL≤1.000.

16. The optical imaging lens as claimed in claim 15, further satisfying 1.359≤ALT/(G12+G34)≤2.685, where ALT is a total thickness of all five lens elements along said optical-axis, an air gap G12 is between said first lens element and said second lens element along said optical axis and an air gap G34 is between said third lens element and said fourth lens element along said optical axis.

17. The optical imaging lens as claimed in claim 15, satisfying (T1+G12+T2+G23+T3)/G34≤2.500, where said first lens element has a first lens element thickness T1 along said optical axis, an air gap G12 is between said first lens element and said second lens element along said optical axis, said second lens element has a second lens element thickness T2 along said optical axis, an air gap G23 is between said second lens element and said third lens element along said optical axis, said third lens element has a third lens element thickness T3 along said optical axis and an air gap G34 is between said third lens element and said fourth lens element along said optical axis.

18. The optical imaging lens as claimed in claim 15, satisfying ALT/G34≤3.900, where ALT is a total thickness of all five lens elements along said optical axis and an air gap G34 is between said third lens element and said fourth lens element along said optical axis.

19. The optical imaging lens as claimed in claim 15, satisfying 3.817≤TTL/BFL≤5.198, where BFL is a distance between said image-side surface of said fifth lens element and said image plane along said optical axis.

20. The optical imaging lens as claimed in claim 15, satisfying 3.209≤(EFL+ALT)/AAG≤5.870, where ALT is a total thickness of all five lens elements along said optical axis and AAG is a sum of all four air gaps between each lens element from said first lens element to said fifth lens element.

* * * * *